US011855775B2

(12) United States Patent
Huang et al.

(10) Patent No.: US 11,855,775 B2
(45) Date of Patent: Dec. 26, 2023

(54) TRANSCODING METHOD AND APPARATUS, MEDIUM, AND ELECTRONIC DEVICE

(71) Applicant: Tencent Technology (Shenzhen) Company Limited, Shenzhen (CN)

(72) Inventors: Qingbo Huang, Shenzhen (CN); Wei Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/899,091

(22) Filed: Aug. 30, 2022

(65) Prior Publication Data
US 2022/0416940 A1 Dec. 29, 2022

Related U.S. Application Data

(63) Continuation of application No. PCT/CN2021/110986, filed on Aug. 5, 2021.

(30) Foreign Application Priority Data

Aug. 20, 2020 (CN) .......................... 202010845705.9

(51) Int. Cl.
*H04L 1/00* (2006.01)
(52) U.S. Cl.
CPC .................................. *H04L 1/0045* (2013.01)
(58) Field of Classification Search
CPC ..... H04L 1/004; H04L 1/0041; H04L 1/0045; H04L 1/0083; H04L 1/0084; H03M 13/25; H03M 13/1585; H03M 13/6356
See application file for complete search history.

(56) References Cited

U.S. PATENT DOCUMENTS

2005/0149821 A1 7/2005 Lee et al.
2011/0126074 A1 5/2011 Calderon et al.
(Continued)

FOREIGN PATENT DOCUMENTS

CN 101783142 A 7/2010
CN 103227926 A 7/2013
(Continued)

OTHER PUBLICATIONS

Tencent Technology, ISR, PCT/CN2021/110986, dated Oct. 26, 2021, 2 pgs.
(Continued)

*Primary Examiner* — Shelly A Chase
(74) *Attorney, Agent, or Firm* — Morgan, Lewis & Bockius LLP

(57) ABSTRACT

Embodiments of this application disclose a signal transcoding method performed by an electronic device. The method includes: acquiring an encoding result of an $i^{th}$ signal frame and encoding results respectively corresponding to first n signal frames of the $i^{th}$ signal frame; generating forward error correction (FEC) encoding results respectively corresponding to the first n signal frames according to the encoding results respectively corresponding to the first n signal frames; and synthesizing the encoding result corresponding to the $i^{th}$ signal frame and the FEC encoding results respectively corresponding to the first n signal frames to generate an encoded frame corresponding to the $i^{th}$ signal frame, the encoded frame comprising a flag bit for indicating a value of n. According to this application, a quantity of FEC encoded frames included in an encoded frame can be flexibly adjusted to improve the reliability of data transmission in a poor network state.

20 Claims, 11 Drawing Sheets

(56) References Cited

U.S. PATENT DOCUMENTS

| | | | |
|---|---|---|---|
| 2013/0227376 A1* | 8/2013 | Hwang | ............... H04L 1/0083 |
| | | | 714/776 |
| 2017/0287493 A1* | 10/2017 | Liu | ..................... G10L 19/06 |
| 2017/0359147 A1 | 12/2017 | Park et al. | |
| 2018/0184373 A1 | 6/2018 | Caggioni et al. | |

FOREIGN PATENT DOCUMENTS

| | | | |
|---|---|---|---|
| CN | 104486628 A | 4/2015 | |
| CN | 107005353 A | 8/2017 | |
| CN | 107592540 A | 1/2018 | |
| CN | 108174234 A | 6/2018 | |
| CN | 109618164 A | 4/2019 | |
| CN | 109923809 A | 6/2019 | |
| CN | 110519004 A | 11/2019 | |
| CN | 111182310 A | 5/2020 | |

OTHER PUBLICATIONS

Tencent Technology, WO, PCT/CN2021/110986, dated Oct. 26, 2021, 4 pgs.

Tencent Technology, IPRP, PCT/CN2021/110986, dated Feb. 16, 2023, 5 pgs.

* cited by examiner

TRANSCODING METHOD AND APPARATUS, MEDIUM, AND ELECTRONIC DEVICE

CROSS-REFERENCE TO RELATED APPLICATIONS

This application is a continuation application of PCT Patent Application No. PCT/CN2021/110986, entitled "TRANSCODING METHOD AND APPARATUS, AND MEDIUM AND ELECTRONIC DEVICE" filed on Aug. 5, 2021, which claims priority to Chinese Patent Application No. 202010845705.9, filed with the State Intellectual Property Office of the People's Republic of China on Aug. 20, 2020, and entitled "TRANSCODING METHOD AND APPARATUS, MEDIUM, AND ELECTRONIC DEVICE", all of which are incorporated herein by reference in their entirety.

FIELD OF THE TECHNOLOGY

This application relates to the technical field of computers and communications, and in particular, to a signal transcoding method and apparatus, a medium, and an electronic device.

BACKGROUND OF THE DISCLOSURE

Forward error correction (FEC) is a method to increase reliability of data communication. In particular, redundant information is transmitted by using data. When an error occurs in the transmission, a receiver is allowed to reconstruct data based on the redundant information. How to use an FEC technology to improve the reliability of data transmission is an urgent technical problem to be solved.

SUMMARY

Embodiments of this application provide a signal transcoding method and apparatus, a medium, and an electronic device, which can flexibly adjust a quantity of FEC encoded frames included in an encoded frame and then ensure reliability of data transmission in a poor network state.

Other features and advantages of this application become obvious through the following detailed descriptions, or may be partially learned partially through the practice of this application.

In one aspect of this application, an embodiment provides a decoding method, performed by a device with a computational processing function, the method including: acquiring a to-be-decoded $i^{th}$ encoded frame, the $i^{th}$ encoded frame including a flag bit for indicating a quantity n of FEC encoded frames, an encoding result corresponding to an $i^{th}$ signal frame, and FEC encoding results respectively corresponding to first n signal frames of the $i^{th}$ signal frame, the quantity n being determined according to a network state; disassembling the $i^{th}$ encoded frame to obtain the encoding result of the $i^{th}$ signal frame and the FEC encoding results respectively corresponding to the first n signal frames of the $i^{th}$ signal frame, the FEC encoding results respectively corresponding to the first n signal frames being respectively used for error correction on the first n signal frames; and decoding the encoding result of the $i^{th}$ signal frame to obtain the $i^{th}$ signal frame.

In one aspect of this application, an embodiment provides a signal transcoding method, performed by a device with a computational processing function, the method including: acquiring an encoding result of an $i^{th}$ signal frame; generating FEC encoding results respectively corresponding to first n signal frames of the $i^{th}$ signal frame; and synthesizing the encoding result corresponding to the $i^{th}$ signal frame and the FEC encoding results respectively corresponding to the first n signal frames to generate an encoded frame corresponding to the $i^{th}$ signal frame, the encoded frame including a flag bit for indicating a value of n.

In one aspect of this application, an embodiment provides a signal transcoding method, performed by a device with a computational processing function, the method including: acquiring an $i^{th}$ encoded frame; disassembling the $i^{th}$ encoded frame in response to the $i^{th}$ encoded frame including a flag bit for indicating a quantity n of FEC encoded frames, the flag bit being used for indicating that the $i^{th}$ encoded frame includes an encoding result corresponding to an $i^{th}$ signal frame and FEC encoding results respectively corresponding to first n signal frames of the $i^{th}$ signal frame; acquiring the encoding result of the $i^{th}$ signal frame obtained by disassembling the $i^{th}$ encoded frame and the FEC encoding results respectively corresponding to the first n signal frames of the $i^{th}$ signal frame, the FEC encoding results respectively corresponding to the first n signal frames being respectively used for error correction on the first n signal frames; and generating a bitstream after transcoding based on the encoding result of the $i^{th}$ signal frame and the FEC encoding results respectively corresponding to the first n signal frames of the $i^{th}$ signal frame.

In one aspect of this application, an embodiment provides an encoding method, performed by a device with a computational processing function, the method including: acquiring a to-be-encoded signal frame; determining a quantity n of FEC encoded frames of an $i^{th}$ signal frame according to a network state; encoding the $i^{th}$ signal frame to obtain an encoding result corresponding to the $i^{th}$ signal frame, and performing FEC encoding on first n signal frames of the $i^{th}$ signal frame to obtain FEC encoding results respectively corresponding to the first n signal frames; and synthesizing the encoding result corresponding to the $i^{th}$ signal frame and the FEC encoding results respectively corresponding to the first n signal frames to generate an encoded frame corresponding to the $i^{th}$ signal frame, the encoded frame including a flag bit for indicating a value of n.

In one aspect of this application, an embodiment provides a decoding apparatus, for use in a device with a computational processing function, the apparatus including: a first acquisition unit configured to acquire a to-be-decoded $i^{th}$ encoded frame, the $i^{th}$ encoded frame including a flag bit for indicating a quantity n of FEC encoded frames, an encoding result corresponding to an $i^{th}$ signal frame, and FEC encoding results respectively corresponding to first n signal frames of the $i^{th}$ signal frame, the quantity n being determined according to a network state; a first disassembly unit configured to disassemble the $i^{th}$ encoded frame to obtain the encoding result of the $i^{th}$ signal frame and the FEC encoding results respectively corresponding to the first n signal frames of the $i^{th}$ signal frame, the FEC encoding results respectively corresponding to the first n signal frames being respectively used for error correction on the first n signal frames; and a decoding unit configured to decode the encoding result of the $i^{th}$ signal frame to obtain the $i^{th}$ signal frame.

In one aspect of this application, an embodiment provides a transcoding apparatus, for use in a device with a computational processing function, the apparatus including: a second acquisition unit configured to acquire an encoding result of an $i^{th}$ signal frame; a first generation unit configured to generate FEC encoding results respectively corresponding to first n signal frames of the $i^{th}$ signal frame; and a second generation unit configured to synthesize the encoding result corresponding to the $i^{th}$ signal frame and the FEC encoding results respectively corresponding to the first n signal frames to generate an encoded frame corresponding to the $i^{th}$ signal frame, the encoded frame including a flag bit for indicating a value of n.

In one aspect of this application, an embodiment provides a transcoding apparatus, for use in a device with a computational processing function, the apparatus including: a third acquisition unit configured to acquire an $i^{th}$ encoded frame; a second disassembly unit configured to disassemble, in response to the $i^{th}$ encoded frame including a flag bit for indicating a quantity n of FEC encoded frames, the $i^{th}$ encoded frame to obtain an encoding result of an $i^{th}$ signal frame, the flag bit being used for indicating that the $i^{th}$ encoded frame includes the encoding result corresponding to the $i^{th}$ signal frame and FEC encoding results respectively corresponding to first n signal frames of the $i^{th}$ signal frame; and a third generation unit configured to acquire the encoding result of the $i^{th}$ signal frame obtained by disassembling the $i^{th}$ encoded frame and the FEC encoding results respectively corresponding to the first n signal frames of the $i^{th}$ signal frame, the FEC encoding results respectively corresponding to the first n signal frames being respectively used for error correction on the first n signal frames; and generate a bitstream after transcoding of the $i^{th}$ encoded frame based on the encoding result of the $i^{th}$ signal frame and the FEC encoding results respectively corresponding to the first n signal frames of the $i^{th}$ signal frame.

In one aspect of this application, an embodiment provides an encoding apparatus, for use in a device with a computational processing function, the apparatus including: a fourth acquisition unit configured to acquire a to-be-encoded signal frame; a processing unit configured to determine a quantity n of FEC encoded frames of an $i^{th}$ signal frame according to a network state; an encoding unit configured to encode the $i^{th}$ signal frame to obtain an encoding result corresponding to the $i^{th}$ signal frame, and perform FEC encoding on first n signal frames of the $i^{th}$ signal frame to obtain FEC encoding results respectively corresponding to the first n signal frames; and a fourth generation unit configured to synthesize the encoding result corresponding to the $i^{th}$ signal frame and the FEC encoding results respectively corresponding to the first n signal frames to generate an encoded frame corresponding to the $i^{th}$ signal frame, the encoded frame including a flag bit for indicating a value of n.

In one aspect of this application, an embodiment provides a computer-readable medium, storing a computer program which, when executed by a processor, causing the processor to implement the signal encoding method, decoding method or transcoding method as described in the above embodiments.

In one aspect of this application, an embodiment provides an electronic device, including: one or more processors; and a storage apparatus configured to store one or more programs, the one or more programs, when executed by the one or more processors, causing the one or more processors to implement the signal encoding method, decoding method or transcoding method as described in the above embodiments.

In one aspect of this application, an embodiment provides a computer program product or computer program, the computer program product or computer program including computer instructions, the computer instructions being stored in a computer-readable storage medium. A processor of a computer device reads the computer instructions from the computer-readable storage medium. The processor executes the computer instructions to cause the computer device to perform the signal encoding method, decoding method or transcoding method according to the above various embodiments.

In the technical solutions according to some embodiments of this application, by acquiring the encoding result of the $i^{th}$ signal frame and the encoding results respectively corresponding to the first n signal frames of the $i^{th}$ signal frame and generating the FEC encoding results respectively corresponding to the first n signal frames, and then by synthesizing the encoding result corresponding to the $i^{th}$ signal frame and the FEC encoding results respectively corresponding to the first n signal frames of the $i^{th}$ signal frame to generate an encoded frame corresponding to the $i^{th}$ signal frame and including a flag bit for indicating a value of n in the encoded frame, a quantity of FEC encoded frames is flexibly adjusted, reliability of data transmission can be ensured in a poor network state, and occupancy of a transmission bandwidth can also be reduced in a good network state.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into and constitute a part of this specification, show embodiments that conform to this application, and are used together with this specification to describe the principle of this application. Obviously, the accompanying drawings in the following descriptions are merely some embodiments of this application, and a person of ordinary skill in the art may further obtain other accompanying drawings according to the accompanying drawings without creative efforts. In the accompanying drawings.

DESCRIPTION OF EMBODIMENTS

Exemplary implementations are now described more comprehensively with reference to the accompanying drawings. However, the exemplary implementations can be implemented in various forms and are not to be understood as being limited to the examples described herein. Conversely, the implementations are provided to make this application more comprehensive and complete, and to comprehensively convey the idea of the exemplary implementations to a person skilled in the art.

Figure 1:
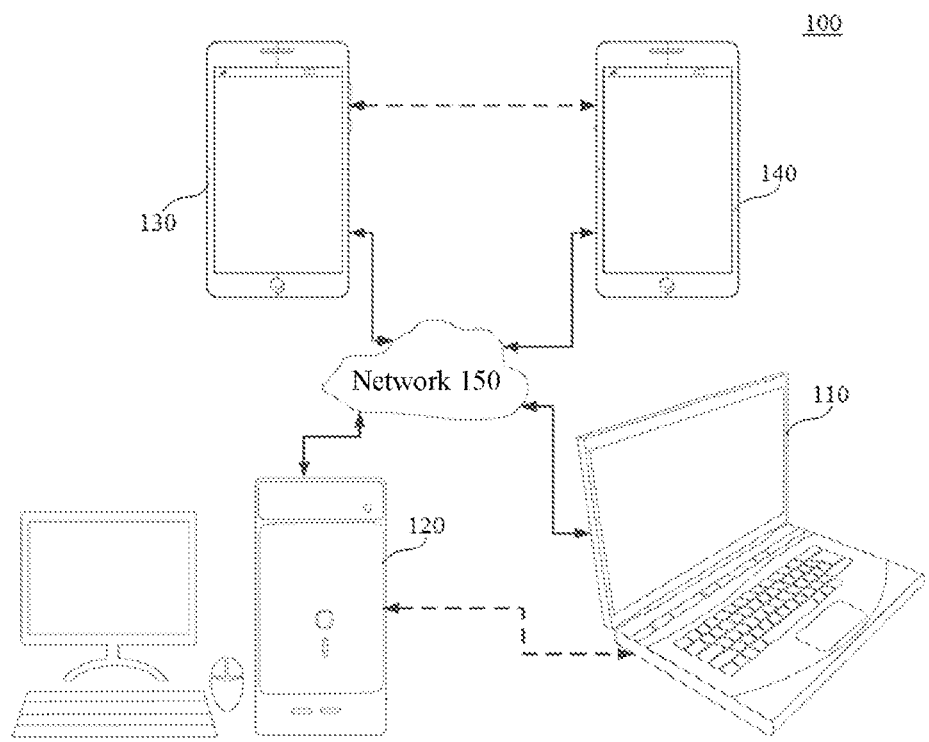
FIG. 1 is a schematic diagram of an exemplary system architecture to which the technical solution according to an embodiment of this application is applicable.

FIG. 1 is a schematic diagram of an exemplary system architecture to which the technical solution according to an embodiment of this application is applicable.

As shown in FIG. 1, the system architecture 100 includes a plurality of terminal apparatuses. The terminal apparatuses may communicate with each other via, for example, a network 150. For example, the system architecture 100 may include a first terminal apparatus 110 and a second terminal apparatus 120 interconnected via the network 150. In the embodiment of FIG. 1, the first terminal apparatus 110 and the second terminal apparatus 120 perform data transmission.

For example, the first terminal apparatus 110 may encode video data (such as a stream of video pictures captured by the terminal apparatus 110) to transmit the video data to the second terminal apparatus 120 via the network 150. Encoded video data is transmitted in the form of one or more encoded video bitstreams. The second terminal apparatus 120 may receive the encoded video data from the network 150, decode the encoded video data to recover the video data, and display the video pictures according to the recovered video data. Certainly, the first terminal apparatus 110 may also encode audio data (such as a stream of audio signals captured by the terminal apparatus 110) to transmit the audio data to the second terminal apparatus 120 via the network 150. Encoded audio data is transmitted in the form of one or more encoded audio bitstreams. The second terminal apparatus 120 may receive the encoded audio data from the network 150, decode the encoded audio data to recover the audio data, and display the audio signals according to the recovered audio data.

In an embodiment of this application, the system architecture 100 may include a third terminal apparatus 130 and a fourth terminal apparatus 140 that perform bidirectional transmission of encoded video data. The bidirectional transmission may occur during, for example, a video conference. For bidirectional data transmission, one of the third terminal apparatus 130 and the fourth terminal apparatus 140 may encode video data (such as a stream of video pictures captured by the terminal apparatus) to transmit the video data to the other of the third terminal apparatus 130 and the fourth terminal apparatus 140 via the network 150. One of the third terminal apparatus 130 and the fourth terminal apparatus 140 may further receive encoded video data transmitted by the other of the third terminal apparatus 130 and the fourth terminal apparatus 140, decode the encoded video data to recover the video data, and display the video pictures on an accessible display apparatus according to the recovered video data. Certainly, bidirectional transmission of encoded audio data may also be performed between the third terminal apparatus 130 and the fourth terminal apparatus 140 during, for example, a voice over Internet protocol (VoIP).

In the embodiment of FIG. 1, the first terminal apparatus 110, the second terminal apparatus 120, the third terminal apparatus 130, and the fourth terminal apparatus 140 may be servers, personal computers, and smart phones, but the principles disclosed in this application may not be limited thereto. Embodiments disclosed in this application apply to laptop computers, tablet computers, media players and/or dedicated video conferencing devices. The network 150 refers to any number of networks transmitting encoded video data among the first terminal apparatus 110, the second terminal apparatus 120, the third terminal apparatus 130, and the fourth terminal apparatus 140, including, for example, wired and/or wireless communication networks. The communication network 150 may exchange data in circuit switched and/or packet switched channels. The network may include telecommunications networks, local area networks, wide area networks and/or the Internet. For the purposes of this application, architecture and topology of the network 150 may be immaterial to the operation disclosed this application unless explained herein below.

Figure 2:
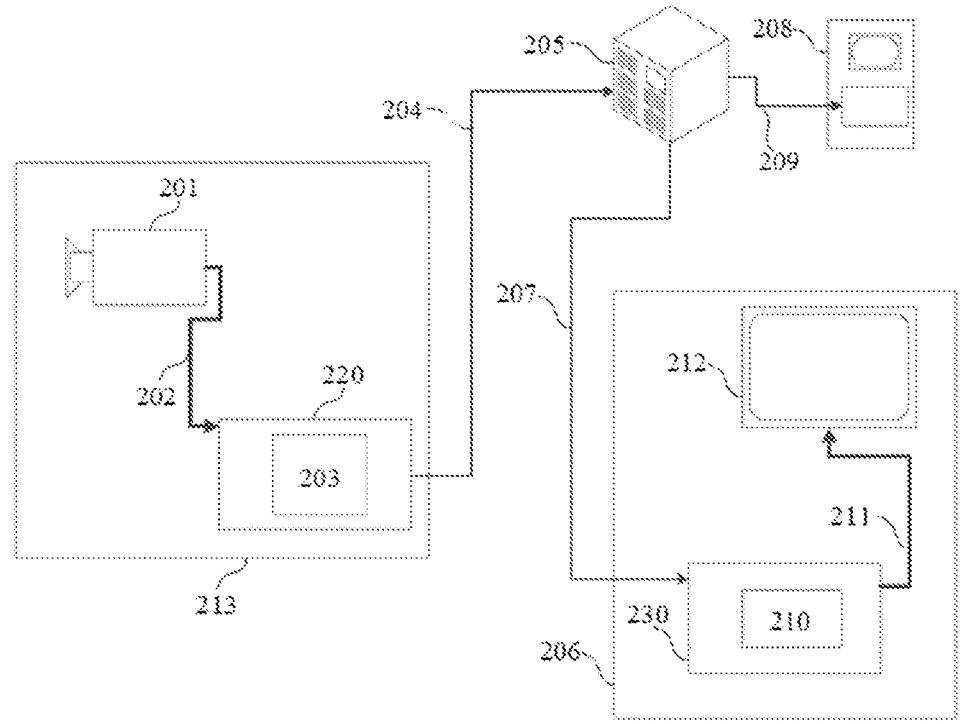
FIG. 2 is a schematic diagram showing how a video encoding apparatus and a video decoding apparatus are placed in a streaming system.

In an embodiment of this application, FIG. 2 illustrates how an encoding apparatus and a decoding apparatus are placed in a streaming system. The encoding apparatus and the decoding apparatus may encode and decode video data or encode and decode audio data. The technical solutions in the embodiments of this application are applicable to application scenarios supporting video or audio transmission, including, for example, video conferencing, digital television (TV), storing compressed video on digital media including a compact disk (CD), a digital versatile disc (DVD), a memory stick and the like, and also applicable to scenarios of audio data transmission, such as scenarios of voice calls over a network.

The streaming system may include a capture subsystem 213. The capture subsystem 213 may include a video source 201 such as a digital camera. The video source 201 creates a stream of video pictures 202 that are uncompressed. In an embodiment, the stream of video pictures 202 includes samples that are taken by the digital camera. The stream of video pictures 202 is depicted as a bold line to emphasize a stream of video pictures with a high data volume when compared to encoded video data 204 (or encoded video bitstreams 204). The stream of video pictures 202 may be processed by an electronic apparatus 220. The electronic apparatus 220 includes an encoding apparatus 203 coupled to the video source 201. The encoding apparatus 203 may include hardware, software, or a combination thereof to enable or implement various aspects of the disclosed subject matter as described in more detail below. The encoded video data 204 (or encoded video bitstreams 204) is depicted as a thin line to emphasize encoded video data 204 (or encoded video bitstreams 204) with a low data volume when compared to the stream of video pictures 202, which may be stored on a streaming server 205 for future use. One or more streaming client subsystems, such as a client subsystem 206 and a client subsystem 208 in FIG. 2, may access the streaming server 205 to retrieve a copy 207 and a copy 209 of the encoded video data 204. The client subsystem 206 may include, for example, a video decoding apparatus 210 in an electronic apparatus 230. The decoding apparatus 210 decodes the incoming copy 207 of the encoded video data and creates an outgoing stream of video pictures 211 that can be rendered on a display 212 (e.g., a display screen) or another rendering apparatus. In some streaming systems, the encoded video data 204, video data 207, and video data 209 (e.g., video bitstreams) may be encoded according to certain video encoding/compression standards.

The electronic apparatus 220 and the electronic apparatus 230 shown in FIG. 2 may include other components not shown. For example, the electronic apparatus 220 may include a decoding apparatus, and the electronic apparatus 230 may include a decoding apparatus as well. In addition, the encoding apparatus and the decoding apparatus shown in FIG. 2 may encode and decode audio data as well.

The implementation details of the technical solution of this embodiment of this application are described in detail in the following.

Figure 3:
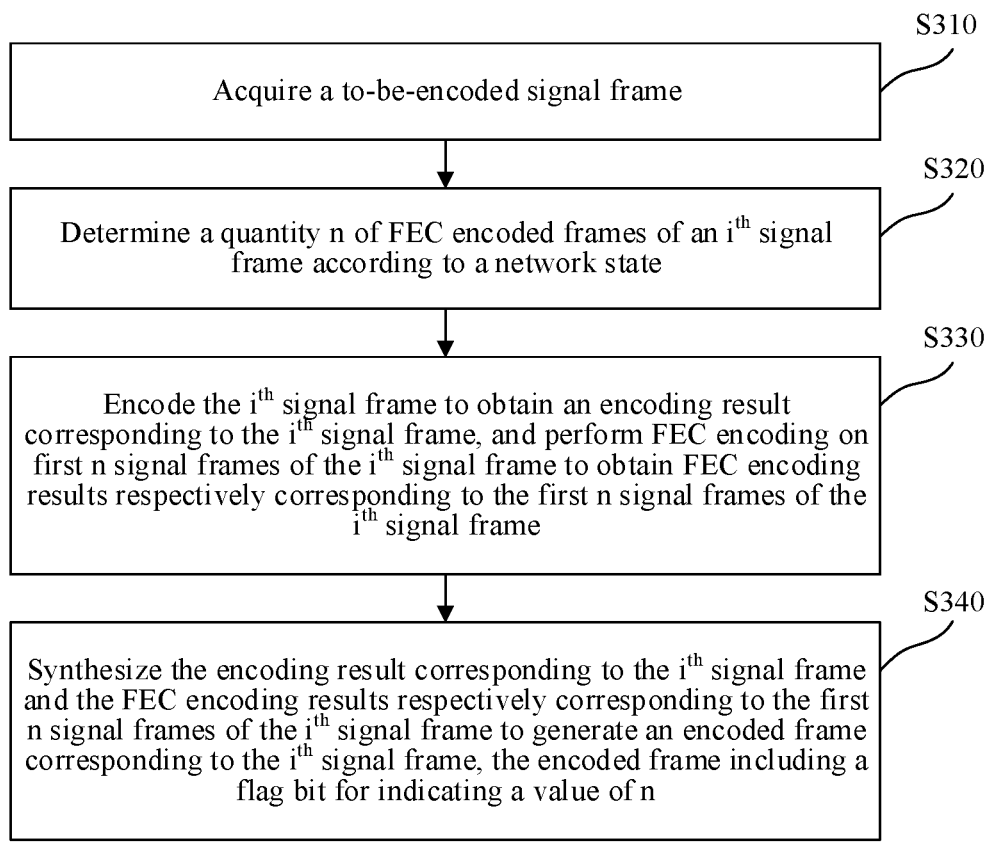
FIG. 3 is a flowchart of an encoding method according to an embodiment of this application.

FIG. 3 is a flowchart of an encoding method according to an embodiment of this application. The encoding method may be performed by a device with a computational processing function, for example, by a terminal device or a server. Referring to FIG. 3, the encoding method includes at least step S310 to step S340, which are introduced in detail below.

In step S310, a to-be-encoded signal frame is acquired.

In an embodiment of this application, the to-be-encoded signal frame may be a multimedia signal frame that is not encoded, such as an audio signal frame, a video signal frame, or an image signal frame. For example, the to-be-encoded signal frame may be acquired by a capture device or generated by a computer. For example, the audio signal frame is captured by a microphone, the video signal frame or image signal frame is captured by a camera, and so on. The to-be-encoded signal frame may be a signal frame that needs to be transmitted to a receiver or a signal frame that needs to be encoded and compressed for storage.

In step S320, a quantity n of FEC encoded frames of an $i^{th}$ signal frame is determined according to a network state.

In an embodiment of this application, the value of n is inversely correlated with the network state. For example, n may be set to a small value if the network state is good and a packet loss rate is low. Conversely, n may be set to a large value if the network state is poor and the packet loss rate is high. n may be any natural number other than 0, such as 1, 2, or 3. Theoretically, n may also be 0. However, in this case, a current encoded frame does not include FEC encoding results of previous signal frames. In some embodiments, n may be a value greater than or equal to 2.

In step S330, the $i^{th}$ signal frame is encoded to obtain an encoding result corresponding to the $i^{th}$ signal frame, and FEC encoding is performed on first n signal frames of the $i^{th}$ signal frame to obtain FEC encoding results respectively corresponding to the first n signal frames of the $i^{th}$ signal frame.

In an embodiment of this application, the $i^{th}$ signal frame may be encoded according to a set encoding strategy. For example, the audio signal frame may be encoded by an Opus (a sound encoding format) encoder. The video signal frame may be encoded by a video encoder based on H.264, VP8, or other standards. A process of performing FEC encoding on the first n signal frames of the $i^{th}$ signal frame is similar to a process of encoding the $i^{th}$ signal frame.

In step S340, the encoding result corresponding to the $i^{th}$ signal frame and the FEC encoding results respectively corresponding to the first n signal frames of the $i^{th}$ signal frame are synthesized to generate an encoded frame corresponding to the $i^{th}$ signal frame, the encoded frame including a flag bit for indicating a value of n.

In an embodiment of this application, a process of synthesizing the encoding result corresponding to the $i^{th}$ signal frame and the FEC encoding results respectively corresponding to the first n signal frames of the $i^{th}$ signal frame may involve: permuting and combining the encoding result corresponding to the $i^{th}$ signal frame and the FEC encoding results respectively corresponding to the first n signal frames of the $i^{th}$ signal frame in order of signal frames to ensure that the generated encoded frame corresponding to the $i^{th}$ signal frame includes the encoding result corresponding to the $i^{th}$ signal frame and the FEC encoding results respectively corresponding to the first n signal frames of the $i^{th}$ signal frame. Moreover, there is a need to set a flag bit in the obtained encoded frame to indicate the value of n to indicate to a decoding end a quantity of FEC encoded frames included therein.

In an embodiment of this application, the $i^{th}$ encoded frame may further include indicating bits and first fields corresponding to signal frames in the first n signal frames of the $i^{th}$ signal frame. The indicating bits corresponding to the signal frames are used for indicating lengths of FEC encoding results corresponding to the signal frames. The first fields corresponding to the signal frames are used for recording the FEC encoding results corresponding to the signal frames. Moreover, the $i^{th}$ encoded frame may further include a second field corresponding to the $i^{th}$ signal frame. The second field is used for recording the encoding result corresponding to the $i^{th}$ signal frame.

In an embodiment of this application, since packet loss of the encoded frame during transmission is a probabilistic event, no packet loss is likely to occur. However, regardless of the packet loss, at least the quality of the encoding result of the $i^{th}$ signal frame currently transmitted needs to be guaranteed. Therefore, a higher bit rate may be adopted for the encoding result of the $i^{th}$ signal frame. Since the FEC encoding results corresponding to the first n signal frames of the $i^{th}$ signal frame are not needed without packet loss, a lower bit rate (that is, a bit rate lower than that of the $i^{th}$ signal frame) may be adopted, so as to occupy fewer bits and ensure reasonable utilization of bandwidth resources.

In an embodiment of this application, a bit rate of the encoding result corresponding to the $i^{th}$ signal frame may be set to be higher than bit rates of the FEC encoding results corresponding to the first n signal frames of the $i^{th}$ signal frame. The bit rates of the FEC encoding results corresponding to the first n signal frames of the $i^{th}$ signal frame may be dynamically adjusted according to an actual situation. In some embodiments, the bit rate of the encoding result corresponding to the $i^{th}$ signal frame and the bit rates of the FEC encoding results respectively corresponding to the first n signal frames successively decrease from back to front. For example, the bit rate of the encoding result corresponding to the $i^{th}$ signal frame is set to 16 kbps, a bit rate of an FEC encoding result corresponding to an $i-1^{th}$ signal frame is set to 14 kbps, a bit rate of an FEC encoding result corresponding to an $i-2^{th}$ signal frame is set to 10 kbps, and so on. Alternatively, the bit rates of the FEC encoding results respectively corresponding to the first n signal frames may be set to the same value and lower than the bit rate of the encoding result corresponding to the $i^{th}$ signal frame. For example, the bit rate of the encoding result corresponding to the $i^{th}$ signal frame is set to 16 kbps, and the bit rates of the FEC encoding results respectively corresponding to the first n signal frames are set to 14 kbps, 12 kbps, 10 kbps, or the like.

In an embodiment of this application, packet loss feedback information may also be determined according to receiving state information of a receiving end of the encoded frame, and then the bit rates of the FEC encoding results respectively corresponding to the first n signal frames of the $i^{th}$ signal frame are adjusted according to the packet loss feedback information. For example, if packet loss information fed back by the receiving end indicates a high packet loss rate, the bit rates of the FEC encoding results respectively corresponding to the first n signal frames of the $i^{th}$ signal frame may be increased to increase an amount of data transmitted to ensure reliability of data transmission. Conversely, if the packet loss information fed back by the receiver indicates a low packet loss rate, the bit rates of the FEC encoding results respectively corresponding to the first n signal frames of the $i^{th}$ signal frame may be decreased to reduce occupancy of a transmission bandwidth.

According to the technical solution in the embodiment shown in FIG. 3, a quantity of forward signal frames corresponding to the FEC encoding results included in the encoded frame can be dynamically indicated through a new encoded frame structure, a quantity of FEC encoded frames can be flexibly adjusted, and the encoded frame can be flexibly adjusted based on the network state, so that the reliability of data transmission can be ensured in a poor network state and the occupancy of a transmission bandwidth can be reduced in a good network state.

Figure 4:
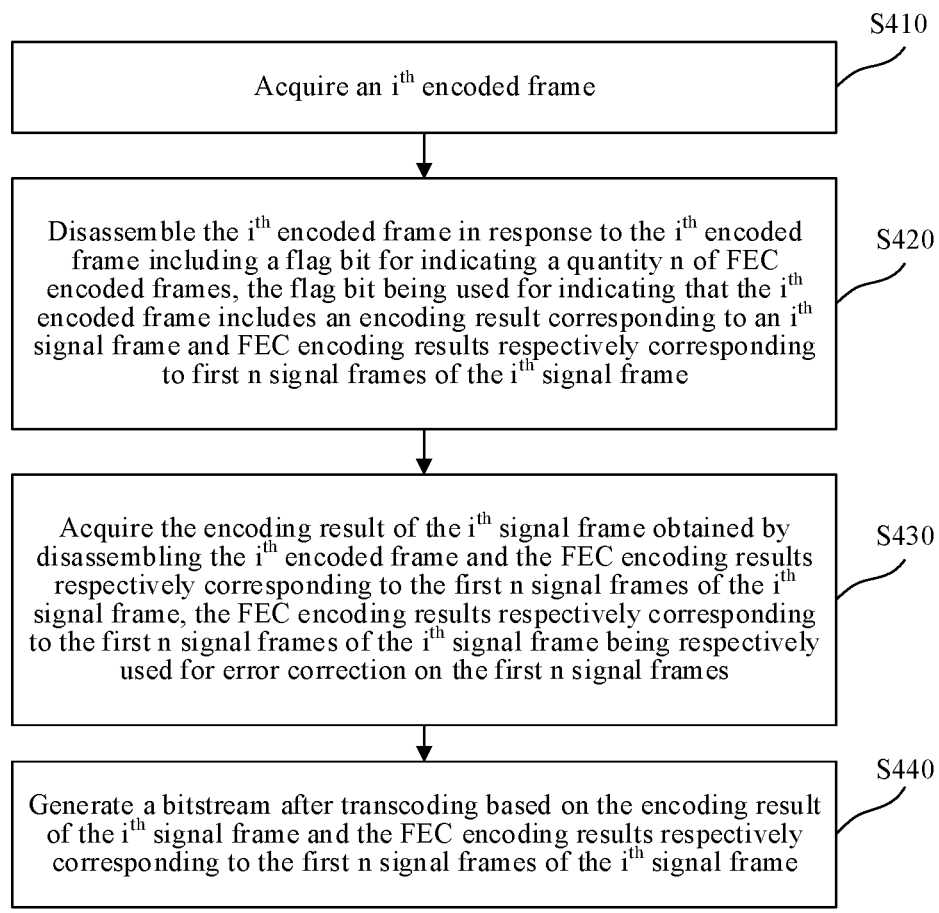
FIG. 4 is a flowchart of an audio signal transcoding method according to an embodiment of this application.

FIG. 4 is a flowchart of an audio signal transcoding method according to an embodiment of this application. The audio signal transcoding method may be performed by a device with a computational processing function, for example, by a terminal device or a server. Referring to FIG. 4, the audio signal transcoding method includes at least step S410 to step S440, which are introduced in detail below.

In step S410, an $i^{th}$ encoded frame is acquired.

In an embodiment of this application, the $i^{th}$ encoded frame may be the encoded frame generated in the embodiment shown in FIG. 3. The generation process and the structure of the $i^{th}$ encoded frame may be obtained with reference to the technical solution in the foregoing embodiment. Details are not described. Certainly, in other embodiments of this application, the $i^{th}$ encoded frame may also be an encoded frame generated based on other standards.

In step S420, the $i^{th}$ encoded frame is disassembled in response to the $i^{th}$ encoded frame including a flag bit for indicating a quantity n of FEC encoded frames, the flag bit being used for indicating that the $i^{th}$ encoded frame includes an encoding result corresponding to an $i^{th}$ signal frame and FEC encoding results respectively corresponding to first n signal frames of the $i^{th}$ signal frame.

In an embodiment of this application, after the $i^{th}$ encoded frame is acquired, it may be first determined whether the $i^{th}$ encoded frame includes the flag bit for indicating the quantity n of the FEC encoded frames. For example, the flag bit may be located in a frame header of the $i^{th}$ encoded frame. Then, the frame header of the $i^{th}$ encoded frame may be first decoded to determine whether the flag bit is included. If the $i^{th}$ encoded frame does not include the flag bit, the $i^{th}$ encoded frame may not be transcoded based on the method shown in FIG. 4. That is, transcoding of the $i^{th}$ encoded frame may be directly skipped.

If the $i^{th}$ encoded frame does not include the flag bit but the $i^{th}$ encoded frame includes an FEC encoding result of a first 1 signal frame, the $i^{th}$ encoded frame may also be transcoded into a bitstream not including any FEC encoding result.

In step S430, the encoding result of the $i^{th}$ signal frame obtained by disassembling the $i^{th}$ encoded frame and the FEC encoding results respectively corresponding to the first n signal frames of the $i^{th}$ signal frame are acquired, the FEC encoding results respectively corresponding to the first n signal frames of the $i^{th}$ signal frame being respectively used for error correction on the first n signal frames.

In an embodiment of this application, the $i^{th}$ encoded frame includes indicating bits and first fields corresponding to signal frames in the first n signal frames. The indicating bits corresponding to the signal frames are used for indicating lengths of FEC encoding results corresponding to the signal frames. The first fields corresponding to the signal frames are used for recording the FEC encoding results corresponding to the signal frames. In this case, when the $i^{th}$ encoded frame is disassembled, the FEC encoding results corresponding to the signal frames may be acquired according to the indicating bits and the first fields corresponding to the signal frames included in the $i^{th}$ encoded frame.

In an embodiment of this application, the $i^{th}$ encoded frame includes a second field corresponding to the $i^{th}$ signal frame. The second field is used for recording the encoding result corresponding to the $i^{th}$ signal frame. In this case, when the $i^{th}$ encoded frame is disassembled, the encoding result corresponding to the $i^{th}$ signal frame may be acquired according to the second field included in the $i^{th}$ encoded frame.

In step S440, a bitstream after transcoding is generated based on the encoding result of the $i^{th}$ signal frame and the FEC encoding results respectively corresponding to the first n signal frames of the $i^{th}$ signal frame.

For example, the bitstream after transcoding of the $i^{th}$ encoded frame may be generated based on the encoding result of the $i^{th}$ signal frame.

In an embodiment of this application, the encoding result of the $i^{th}$ signal frame may be directly used as the bitstream after transcoding of the $i^{th}$ encoded frame. Alternatively, the encoding result of the $i^{th}$ signal frame may be decoded to obtain the $i^{th}$ signal frame, and then the $i^{th}$ signal frame is re-encoded according to a protocol corresponding to a desired bitstream to obtain the bitstream after transcoding.

In an embodiment of this application, if a bitstream after transcoding corresponding to a $j^{th}$ signal frame in the first n signal frames is not generated, the bitstream after transcoding corresponding to the $j^{th}$ signal frame may be generated according to an FEC encoding result corresponding to the $j^{th}$ signal frame obtained by disassembling the $i^{th}$ encoded frame.

In an embodiment of this application, if a $j^{th}$ encoded frame corresponding to the $j^{th}$ signal frame in the first n signal frames is not acquired, an encoding result corresponding to the $j^{th}$ signal frame may be recovered according to the FEC encoding result corresponding to the $j^{th}$ signal frame. In the embodiment of this application, since n may be a value greater than or equal to 2, a plurality of encoded frames after the $j^{th}$ encoded frame may include the FEC encoding result corresponding to the $i^{th}$ signal frame. In order to ensure an effect of the recovered encoding result of the $i^{th}$ signal frame, an encoded frame closest to the $j^{th}$ encoded frame may be selected from encoded frames after the $j^{th}$ encoded frame to recover the encoding result of the $j^{th}$ signal frame.

For example, if the $i^{th}$ encoded frame is a frame acquired from the encoded frames after the $i^{th}$ encoded frame and closest to the $i^{th}$ encoded frame, the bitstream after transcoding corresponding to the $j^{th}$ signal frame may be generated according to the FEC encoding result corresponding to the $j^{th}$ signal frame obtained by disassembling the $i^{th}$ encoded frame. The $j^{th}$ encoded frame is an encoded frame corresponding to the $j^{th}$ signal frame in the first n signal frames. For example, the FEC encoding result corresponding to the $j^{th}$ signal frame may be directly used as the bitstream after transcoding corresponding to the $j^{th}$ signal frame. Alternatively, the FEC encoding result of the $j^{th}$ signal frame may be decoded, and then re-encoding is performed according to a protocol corresponding to a desired bitstream to obtain the bitstream after transcoding.

If the $i^{th}$ encoded frame is not the frame acquired from the encoded frames after the $j^{th}$ encoded frame and closest to the $j^{th}$ encoded frame, a target encoded frame acquired from the encoded frames after the $j^{th}$ encoded frame and closest to the $j^{th}$ encoded frame may be first determined, and then the bitstream after transcoding corresponding to the $j^{th}$ signal frame is generated according to an FEC encoding result corresponding to the $j^{th}$ signal frame obtained by disassembling the target encoded frame. Certainly, the target encoded frame here needs to include the FEC encoding result corresponding to the $j^{th}$ signal frame.

According to the technical solution in the embodiment shown in FIG. 4, the encoded frame obtained in the embodiment shown in FIG. 3 can be transcoded, and then can be provided for a device that cannot decode the encoded frame obtained in the embodiment shown in FIG. 3, which improves compatibility of the system.

Figure 5:
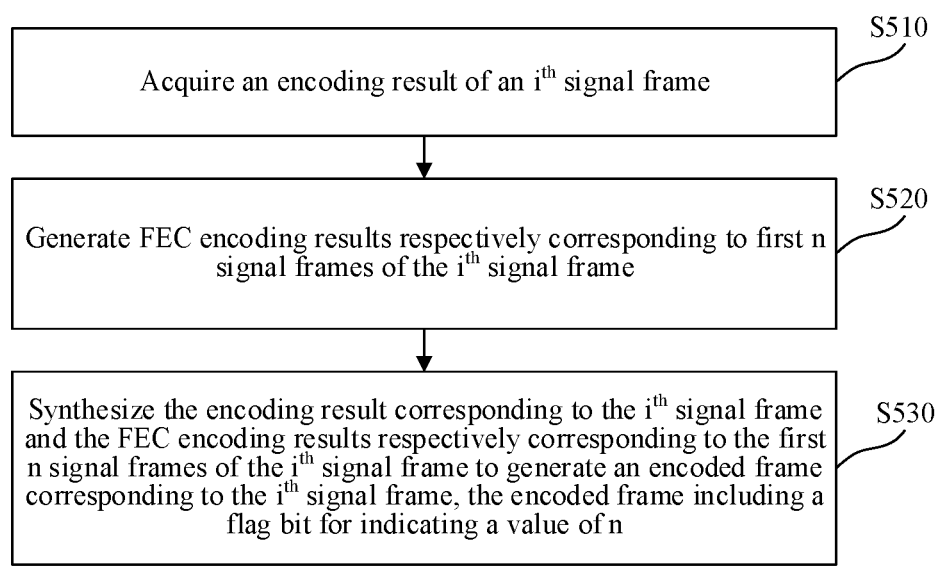
FIG. 5 is a flowchart of an audio signal transcoding method according to an embodiment of this application.

FIG. 5 is a flowchart of an audio signal transcoding method according to an embodiment of this application. The audio signal transcoding method may be performed by a device with a computational processing function, for example, by a terminal device or a server. Referring to FIG. 5, the audio signal transcoding method includes at least step S510 to step S530, which are introduced in detail below.

In step S510, an encoding result of an $i^{th}$ signal frame is acquired.

In some embodiments, first n signal frames of the $i^{th}$ signal frame or encoding results respectively corresponding to the first n signal frames of the $i^{th}$ signal frame may also be acquired.

In an embodiment of this application, the signal frame may be a multimedia signal frame, such as an audio signal frame, a video signal frame, or an image signal frame. The encoding result of the $i^{th}$ signal frame and the encoding results respectively corresponding to the first n signal frames of the $i^{th}$ signal frame may be standard bitstreams including no FEC encoding information, for example, an encoding result obtained by encoding the audio signal frame by an Opus encoder, an encoding result obtained by encoding the video signal frame by a video encoder based on H.264, VP8, or other standards, and so on.

In step S520, FEC encoding results respectively corresponding to first n signal frames of the $i^{th}$ signal frame are generated.

In the embodiment of this application, the first n signal frames of the $i^{th}$ signal frame may be acquired, and the FEC encoding results respectively corresponding to the first n signal frames may be generated according to the first n signal frames.

Alternatively, the FEC encoding results respectively corresponding to the first n signal frames of the $i^{th}$ signal frame may also be generated according to the encoding results respectively corresponding to the first n signal frames of the $i^{th}$ signal frame.

In an embodiment of this application, the encoding results respectively corresponding to the first n signal frames of the $i^{th}$ signal frame may be used as the FEC encoding results respectively corresponding to the first n signal frames. However, in this way, the encoded frame finally generated may occupy a large bandwidth during transmission. Therefore, the encoding results respectively corresponding to the first n signal frames may be re-quantized. For example, the encoding results respectively corresponding to the first n signal frames may be decoded to obtain decoding results respectively corresponding to the first n signal frames, then the decoding results respectively corresponding to the first n signal frames are re-quantized to obtain quantization results respectively corresponding to the first n signal frames, and finally, the quantization results respectively corresponding to the first n signal frames are encoded to generate the FEC encoding results respectively corresponding to the first n signal frames. In some embodiments, decoding and encoding before and after the re-quantization process may be normal decoding and encoding, for example, decoding and encoding performed by an Opus codec. However, this manner is more complex. Therefore, the decoding and encoding before and after the re-quantization process may be entropy decoding and entropy encoding, which can effectively improve decoding and encoding rates and can reduce complexity.

In an embodiment of this application, the decoding results obtained by decoding the encoding results respectively corresponding to the first n signal frames include subframe gain and excitation signal energy. In this case, the process of re-quantizing the decoding results respectively corresponding to the first n signal frames may involve increasing a value of the subframe gain and equally decreasing the excitation signal energy, then performing quantization based on the excitation signal energy to obtain a number of data bits, stopping increasing the value of the subframe gain and stopping reducing the excitation signal energy in response to the number of data bits per unit time being less than a target bit rate, and taking the value of the subframe gain stopped increasing and the excitation signal energy stopped reducing as the quantization results. In this way, a downlink bandwidth occupied by the encoded frame finally generated can be effectively reduced.

In step S530, the encoding result corresponding to the $i^{th}$ signal frame and the FEC encoding results respectively corresponding to the first n signal frames of the $i^{th}$ signal frame are synthesized to generate an encoded frame corresponding to the $i^{th}$ signal frame, the encoded frame including a flag bit for indicating a value of n.

In an embodiment of this application, details of step S530 are similar to the processing details of step S330 shown in FIG. 3 in the foregoing embodiment. Details are not described.

In an embodiment of this application, a specified encoded frame corresponding to the $i^{th}$ signal frame may also be generated according to the encoding result of the $i^{th}$ signal frame and the FEC encoding result corresponding to the first 1 signal frame of the $i^{th}$ signal frame. The specified encoded frame is an encoded frame including only the FEC encoding result of the first 1 signal frame in an existing standard. In this case, the flag bit may not be set in the encoded frame, which realizes forward compatibility of the existing system.

According to the technical solution in the embodiment shown in FIG. 5, an ordinary bitstream (such as a standard bitstream) may be converted into the encoded frame in the embodiment shown in FIG. 3, which can also improve the compatibility of the system.

Figure 6:
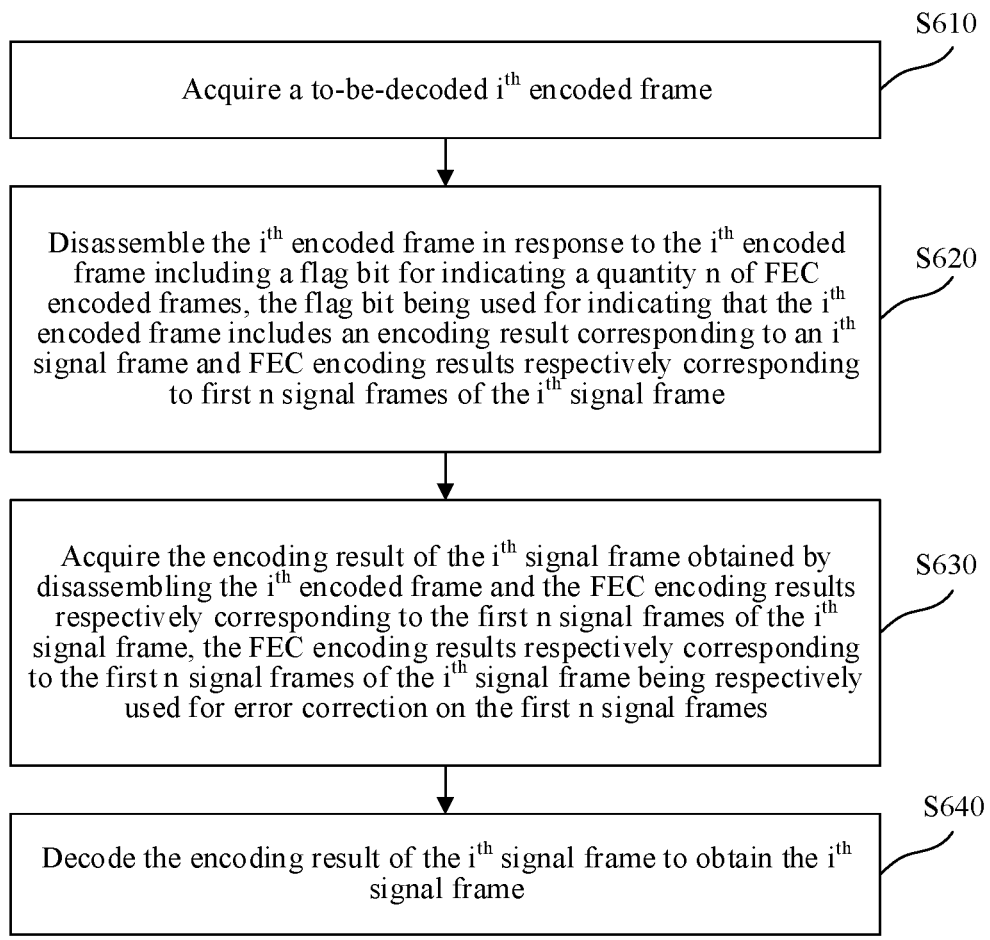
FIG. 6 is a flowchart of a decoding method according to an embodiment of this application.

FIG. 6 is a flowchart of a decoding method according to an embodiment of this application. The decoding method may be performed by a device with a computational processing function, for example, by a terminal device or a server. Referring to FIG. 6, the decoding method includes at least step S610 to step S640, which are introduced in detail below.

In step S610, a to-be-decoded $i^{th}$ encoded frame is acquired.

In an embodiment of this application, the $i^{th}$ encoded frame may be the encoded frame generated in the embodiment shown in FIG. 3 or the encoded frame obtained by transcoding in the embodiment shown in FIG. 5. The generation process, the transcoding process, and the structure of the $i^{th}$ encoded frame may be obtained with reference to the technical solution in the foregoing embodiment. Details are not described. Certainly, in other embodiments of this application, the $i^{th}$ encoded frame may also be an encoded frame generated based on other standards.

In step S620, the $i^{th}$ encoded frame is disassembled in response to the $i^{th}$ encoded frame including a flag bit for indicating a quantity n of FEC encoded frames, the flag bit being used for indicating that the $i^{th}$ encoded frame includes an encoding result corresponding to an $i^{th}$ signal frame and FEC encoding results respectively corresponding to first n signal frames of the $i^{th}$ signal frame.

In an embodiment of this application, details of step S620 are similar to the processing details of step S420 shown in FIG. 4 in the foregoing embodiment. Details are not described.

In step S630, the encoding result of the $i^{th}$ signal frame obtained by disassembling the $i^{th}$ encoded frame and the FEC encoding results respectively corresponding to the first n signal frames of the $i^{th}$ signal frame are acquired, the FEC encoding results respectively corresponding to the first n signal frames of the $i^{th}$ signal frame being respectively used for error correction on the first n signal frames.

In an embodiment of this application, details of step S630 are similar to the processing details of step S430 shown in FIG. 4 in the foregoing embodiment. Details are not described.

In step S640, the encoding result of the $i^{th}$ signal frame is decoded to obtain the $i^{th}$ signal frame.

In an embodiment of this application, the encoding result of the $i^{th}$ signal frame may be decoded according to a standard protocol used in the encoding of the $i^{th}$ signal frame. For example, the $i^{th}$ signal frame is encoded by an Opus encoder, so the encoding result of the $i^{th}$ signal frame may be decoded by an Opus decoder.

In an embodiment of this application, if a $i^{th}$ encoded frame corresponding to the $j^{th}$ signal frame in the first n signal frames is not acquired, the $j^{th}$ signal frame may be recovered according to the FEC encoding result corresponding to the $j^{th}$ signal frame. In the embodiment of this application, since n may be a value greater than or equal to 2, a plurality of encoded frames after the $j^{th}$ encoded frame may include the FEC encoding result corresponding to the $j^{th}$ signal frame. In order to ensure an effect of the recovered $j^{th}$ signal frame, an encoded frame closest to the $j^{th}$ encoded frame may be selected from encoded frames after the $j^{th}$ encoded frame to recover the $j^{th}$ signal frame.

For example, if the $i^{th}$ encoded frame is a frame acquired from the encoded frames after the $i^{th}$ encoded frame and closest to the $i^{th}$ encoded frame, the FEC encoding result corresponding to the $j^{th}$ signal frame obtained by disassembling the $i^{th}$ encoded frame may be decoded, and the $j^{th}$ signal frame is generated according to a decoding result. For example, the decoding result may be directly used as the $i^{th}$ encoded frame.

If the $i^{th}$ encoded frame is not the frame acquired from the encoded frames after the $j^{th}$ encoded frame and closest to the $j^{th}$ encoded frame, a target encoded frame acquired from the encoded frames after the $j^{th}$ encoded frame and closest to the $i^{th}$ encoded frame may be first determined, then an FEC encoding result corresponding to the $j^{th}$ signal frame obtained by disassembling the target encoded frame is decoded, and the $j^{th}$ signal frame is generated according to a decoding result. Certainly, the target encoded frame here needs to include the FEC encoding result corresponding to the $i^{th}$ signal frame.

According to the technical solution in the embodiment shown in FIG. 6, a decoding end can determine a quantity of FEC encoded frames according to the flag bit in the encoded frame, and then can decode the encoded frame according to the quantity and reconstruct non-received data frames according to the FEC encoded frames, which improves reliability of data transmission.

Implementation details of the technical solutions in the embodiments of this application are described in detail below with reference to FIG. 7 to FIG. 13 by taking encoding and decoding processes of the audio signal during transmission as an example.

Figure 7:
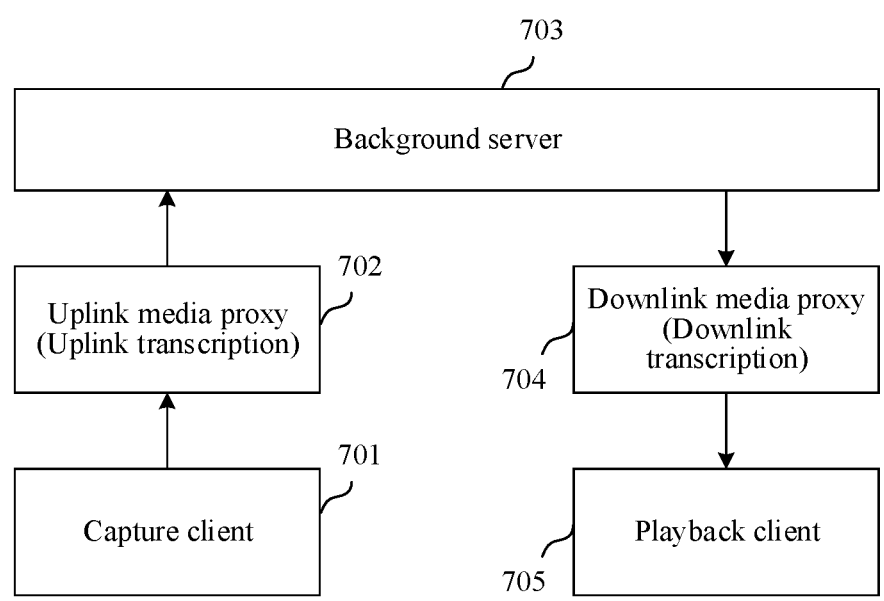
FIG. 7 is a schematic diagram of an audio signal transmission system according to an embodiment of this application.

In an application scenario of this application, during a VoIP call, if the receiving end cannot normally receive packets due to a poor network state, voice cannot be recovered completely, which may damage the voice quality of VoIP or cause stuttering. In order to solve this problem, an FEC technology may be introduced. For example, after packaging and transmitting a current audio signal frame (hereinafter referred to as "current signal frame"), a transmitting end still allocates a certain bandwidth to the current signal frame in the next data packet. That is, "redundant packet" is introduced into other data packets, so as to establish additional data redundancy of the current signal frame at the transmitting end. During the transmission, once the current signal frame is lost, content of the lost packet can be recovered through the "redundant packet" after the redundant packet arrives at the receiving end. In an embodiment of this application, an audio signal transmission system may mainly include, as shown in FIG. 7, a capture client 701, an uplink media proxy 702, a background server 703, a downlink media proxy 704, and a playback client 705.

The capture client 701 may also be referred to as a transmitting client, which includes an encoder, and mainly encodes captured audio signals and encapsulates the audio signals into data packets for transmission.

The uplink media proxy 702 is also referred to as an uplink transcriber, which is an uplink media gateway and has a main function of converting a received bitstream of a new version protocol (the bitstream of the new version protocol in the embodiment of this application will be introduced in the following content) transmitted by the capture client 701 into a bitstream of an old version protocol (the bitstream of the old version protocol in the embodiment of this application may be a standard bitstream not including FEC information). In this way, the playback client using the old version protocol can normally perform decoding, realizing forward compatibility. Certainly, if the uplink media proxy 702 receives the bitstream of the old version protocol, the bitstream can be directly forwarded to the background server 703.

The background server 703 includes a protocol interface. A VoIP communication system may need to interconnect different protocols, such as a VoIP protocol and a public switched telephone network (PSTN) protocol. Therefore, the background server 703 may also realize interconnection between a plurality of protocols. For example, the background server 703 may also introduce a transcoder to complete interconnection. For example, a process of transcoding a bitstream of a protocol 1 into a bitstream of a protocol 2 includes: calling a decoder corresponding to the protocol 1 to recover a voice frame, and then calling an encoder corresponding to the protocol 2 to encode the voice frame and output the bitstream corresponding to the protocol 2. Certainly, in the embodiment of this application, if the uplink media proxy 702 has transcoded the bitstream transmitted to the background server 703 and bitstreams in the background server 703 are bitstreams of the same protocol version, the background server 703 does not need transcoding, but the background server 703 can perform processing such as audio mixing.

The downlink media proxy 704 is symmetric with the uplink media proxy 702, and has a main function of converting the bitstream of the old version protocol delivered by the background server 703 into the bitstream of the new version protocol and then transmitting the bitstream of the new version protocol to the playback client 705. For example, if the downlink media proxy 704 determines that the playback client 705 uses the old version protocol, the downlink media proxy 704 receives the bitstream of the old version protocol delivered by the background server 703 and directly forwards the bitstream of the old version protocol to the playback client 705. If it is determined that the playback client 705 uses the new version protocol, the downlink media proxy 704 receives the bitstream of the old version protocol delivered by the background server 703, converts the bitstream into the bitstream of the new version protocol, and forwards the bitstream of the new version protocol to the playback client 705.

In the system architecture shown in FIG. 7, a bitstream protocol in a network segment between the uplink media proxy 702 and the downlink media proxy 704 through the background server 703 may be maintained as the old version protocol, so as to achieve forward compatibility management. A combination of the uplink media proxy 702, the background server 703, and the downlink media proxy 704 shown in FIG. 7 is only one implementation. In the embodiment of this application, a network segment in which the bitstream of the old version protocol can be transmitted during end-to-end transmission can also be ensured in other manners.

Figure 8:
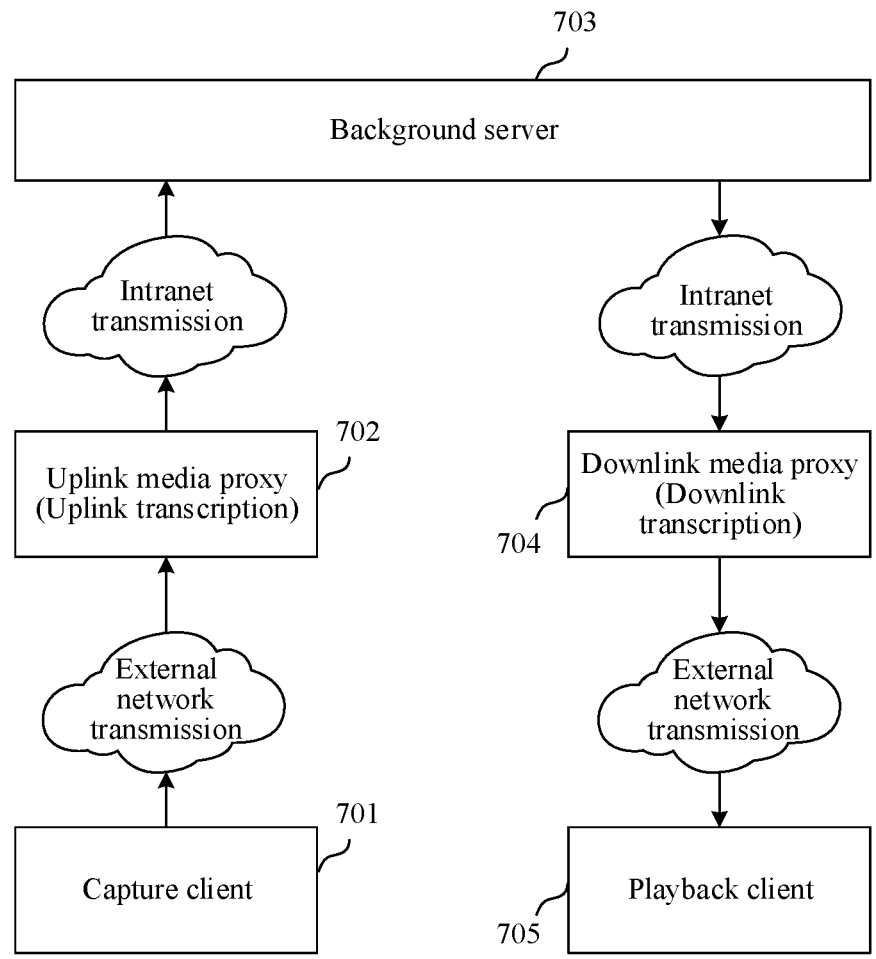
FIG. 8 is a schematic diagram of an audio signal transmission system according to an embodiment of this application.

For the system architecture shown in FIG. 7, in an exemplary application scenario, as shown in FIG. 8, transmission is performed between the uplink media proxy 702 and the background server 703 and between the background server 703 and the downlink media proxy 704 via an intranet of a service party. However, transmission is performed between the capture client 701 and the uplink media proxy 702 and between the downlink media proxy 704 and the playback client 705 via an external network. In the application scenario shown in FIG. 8, a network segment for transmitting the bitstream of the old version protocol may be formed in the intranet of the service party, and then audio data can be transmitted by clients using different versions of protocols.

If protocol versions used by the capture client and the playback client participating in communication are identical, that is, no compatibility problem arises, the uplink media proxy 702 and the downlink media proxy 704 may not be provided in FIG. 7 and FIG. 8.

Processing processes of the capture client 701, the uplink media proxy 702, the downlink media proxy 704, and the playback client 705 are described in detail below.

Figure 9:
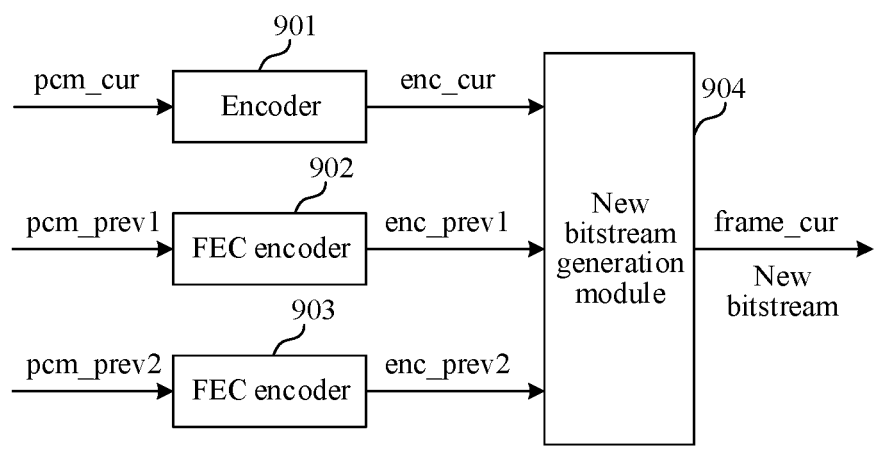
FIG. 9 is a schematic diagram of a processing process of a capture client shown in FIG. 7 and FIG. 8.

In an embodiment of this application, the capture client 701 may also be referred to as a transmitting end, which mainly compresses the audio signal into a bitstream through the encoder. In the embodiment of this application, the capture client may encode an inputted audio signal frame through an encoder flow corresponding to the new version protocol. As shown in FIG. 9, assuming that an audio signal inputted to a current signal frame is pcm_cur, an audio signal inputted to a previous frame of the current signal frame is pcm_prev1, and an audio signal inputted to the second frame before the current signal frame is pcm_prev2 (assuming that the current signal frame is an $i^{th}$ frame, the previous frame of the current signal frame is an frame, and the second frame before the current signal frame is an i–$2^{th}$ frame), the current signal frame pcm_cur can be encoded by an encoder 901 to obtain an encoding result enc_cur; the previous frame pcm_prev1 of the current signal frame is encoded by an FEC encoder 902 to obtain an encoding result enc_prev1; and the second frame pcm_prev2 before the current signal frame is encoded by an FEC encoder 903 to obtain an encoding result enc_prev2. Then, enc_cur, enc_prev1, and enc_prev2 are inputted together to a new bitstream generation module 904 to obtain an encoded frame frame_cur of a new bitstream (the new bitstream is a bitstream generated according to the new version protocol) corresponding to the current signal frame. The encoder 901 may be a common encoder to encode audio signals, such as an Opus encoder. Processing flows of the FEC encoder 902 and the FEC encoder 903 during the encoding may be the same as a processing flow of the encoder 901.

Figure 10:
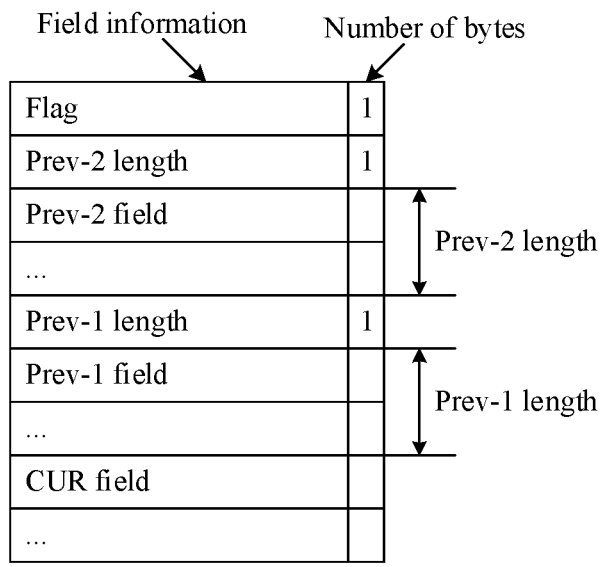
FIG. 10 is a schematic structural diagram of an encoded frame according to an embodiment of this application.

An encoded frame in the new bitstream obtained with the encoding method shown in FIG. 9 includes FEC encoding results of first two signal frames of the current signal frame. In order to facilitate identification of the encoded frame in the new bitstream, in an embodiment of this application, the encoded frame in the new bitstream may have a structure as shown in FIG. 10. A field flag in the $1^{st}$ byte in the structure of the encoded frame is used for identifying a number of recoverable frames, which may be used for distinguishing a conventional bitstream from the new bitstream proposed in the embodiment of this application. For example, in the embodiment shown in FIG. 9, the flag indicates a value of 2. A field "Prev-2 length" of the $2^{nd}$ byte in the structure of the encoded frame is used for recording a length of an FEC encoding result of the second signal frame pcm_prev2 before the current signal frame. A byte of a Prev-2 length after the $2^{nd}$ byte is used for indicating an FEC encoding result of the second signal frame pcm_prev2 before the current signal frame. Next, in the structure of the encoded frame, a field of "Prev-1 length" of 1 byte is used for recording a length of an FEC encoding result of the previous signal frame pcm_prev1 of the current signal frame, and a byte of a Prev-1 length is used for indicating an FEC encoding result of the previous signal frame pcm_prev1 of the current signal frame. The structure of the encoded frame further includes a CUR field for indicating an encoding result of the current signal frame.

In an embodiment of this application, bit rates of the bitstreams enc_cur, enc_prev1, and enc_prev2 may also be adjusted. For example, by taking the Opus encoder as an example, a signal at a sampling rate of 16 kHz has good quality at a bit rate of 16 kbps. In consideration of actual packet loss, different bit rates may be adopted for enc_cur, enc_prev1, and enc_prev2. For example, a high bit rate may be adopted for enc_cur, and relatively low bit rates may be adopted for enc_prev1 and enc_prev2, which has the following advantages. Since packet loss is a probabilistic event, no packet loss is likely to occur. However, regardless of the packet loss, at least the quality of enc_cur needs to be guaranteed. Therefore, a higher bit rate may be adopted for enc_cur. Since enc_prev1 and enc_prev2 are not needed without packet loss, lower bit rates may be adopted, so as to occupy fewer bits and ensure reasonable utilization of bandwidth resources. For example, in an embodiment, the bit rate of enc_cur may be set to 16 kbps and the bit rates of enc_prev1 and enc_prev2 may be set to 12 kbps, or the bit rate of enc_cur may be set to 16 kbps, the bit rate of enc_prev1 may be set to 14 kbps, and the bit rate of enc_prev2 may be set to 10 kbps.

In an embodiment of this application, the encoding end (the capture client 701 as shown in FIG. 7 and FIG. 8) may also adjust the bit rates of enc_prev1 and enc_prev2 according to packet loss information (the packet loss information may be located in received feedback information transmitted by a receiver (the playback client 705 as shown in FIG. 7 and FIG. 8)) fed back by the receiver of the encoded frame. For example, if the packet loss information fed back by the receiver indicates a high packet loss rate, the bit rates of enc_prev1 and enc_prev2 may be increased. Conversely, if the packet loss information fed back by the receiver indicates a low packet loss rate, the bit rates of enc_prev1 and enc_prev2 may be decreased.

FIG. 9 and FIG. 10 are illustrated with an example in which a current encoded frame includes FEC encoding results of first two signal frames of a current signal frame. In other embodiments of this application, the current encoded frame may include FEC encoding results of any n (n may be a natural number other than 0, such as 1, 2, or 3. Theoretically, n may also be 0. However, in this case, the current encoded frame does not include FEC encoding results of previous signal frames) signal frames before the current signal frame. The value of n needs to be identified through a flag field in the current encoded frame. As an embodiment of this application, the encoding end (the capture client 701 as shown in FIG. 7 and FIG. 8) may set the value of n according to a network state. For example, n may be set to a small value if the network state is good and a packet loss rate is low. Conversely, n may be set to a large value if the network state is poor and the packet loss rate is high. Thus, in the embodiment of this application, by designing a new encoded frame structure, a quantity of forward signal frames corresponding to the FEC encoding results included in the encoded frame can be dynamically indicated through the new encoded frame structure, and the encoded frame can be flexibly adjusted based on the network state, so that the quality of a voice call can be ensured in a poor network state.

The following description is continued with an example in which a current encoded frame includes FEC encoding results of first two signal frames of a current signal frame.

Figure 11:
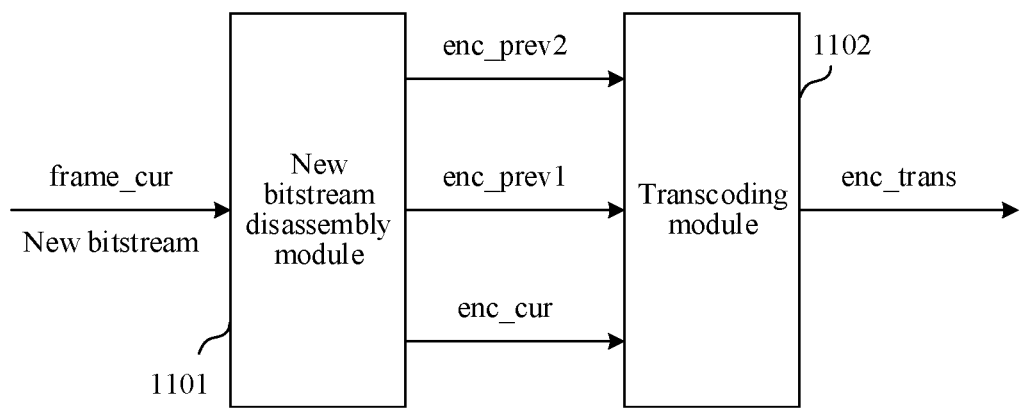
FIG. 11 is a schematic diagram of a processing process of an uplink media proxy shown in FIG. 7 and FIG. 8.

In an embodiment of this application, the uplink media proxy 702 shown in FIG. 7 and FIG. 8 mainly converts a bitstream of a new version protocol into a bitstream of an old version protocol. The bitstream of the new version protocol in the embodiment is the bitstream generated with the method shown in FIG. 9 and having the structure shown in FIG. 10. The bitstream of the old version protocol may be a current standard bitstream. For example, as shown in FIG. 11, a current encoded frame frame_cur of a new bitstream (the new bitstream is a bitstream generated according to the new version protocol) is inputted to a new bitstream disassembly module 1101 to obtain standard bitstreams of 3 frames of information, i.e., enc_cur, enc_prev1, and enc_prev2. The new bitstream disassembly module 1101 may perform disassembly based on a structure (i.e., the structure shown in FIG. 10) of the new bitstream. enc_cur is an encoding result of the current signal frame pcm_cur, enc_prev1 is an FEC encoding result of a previous frame pcm_prev1 of the current signal frame, and enc_prev2 is an FEC encoding result of the second frame pcm_prev2 of the current signal frame. Then, a transcoding module 1102 is called to output a standard bitstream enc_trans. A process thereof may be as follows.

If first two encoded frames of the current encoded frame are both received, enc_prev1 and enc_prev2 are useless information and can be discarded. In this case, the transcoding result enc_trans outputted by the transcoding module 1102 includes enc_cur.

If the previous encoded frame of the current encoded frame is lost and the second encoded frame before the current encoded frame is normally received, enc_prev2 is useless information and can be discarded. In this case, the transcoding result enc_trans outputted by the transcoding module 1102 includes enc_cur and enc_prev1. enc_cur is a standard bitstream (the standard bitstream does not include FEC encoding information) corresponding to the current encoded frame, and enc_prev1 serves as a standard bitstream corresponding to the previous encoded frame of the current encoded frame, both of which can be transmitted separately.

If the previous encoded frame of the current encoded frame is normally received and the second encoded frame before the current encoded frame is lost, bit_prev1 is useless information and can be discarded. In this case, the transcoding result enc_trans outputted by the transcoding module 1102 includes enc_cur and enc_prev2. enc_cur is a standard bitstream corresponding to the current encoded frame, and enc_prev2 serves as a standard bitstream corresponding to the second encoded frame of the current encoded frame, both of which can be transmitted separately.

If the first two encoded frames of the current encoded frame are both lost, enc_prev1 and enc_prev2 are useful information. In this case, the transcoding result enc_trans outputted by the transcoding module 1102 includes enc_cur, enc_prev1, and enc_prev2. enc_cur is a standard bitstream corresponding to the current encoded frame, enc_prev1 serves as a standard bitstream corresponding to the previous encoded frame of the current encoded frame, and enc_prev2 serves as a standard bitstream corresponding to the second encoded frame of the current encoded frame, all of which can be transmitted separately.

If an encoded frame j is lost, a plurality of encoded frames after the encoded frame j are normally received, and the plurality of encoded frames include FEC encoding information corresponding to the encoded frame j, a standard bitstream corresponding to the encoded frame j can be generated according to an encoded frame in subsequent encoded frames that is closest to the encoded frame j. For example, if the encoded frame j is lost, an encoded frame j+1 and an encoded frame j+2 are normally received, and the encoded frame j+1 and the encoded frame j+2 include the FEC encoding information corresponding to the encoded frame j, the standard bitstream corresponding to the encoded frame j can be recovered according to the FEC encoding information in the encoded frame j+1. The manner of performing recovery through the closest encoded frame can ensure consistency of the obtained standard bitstream and then ensure continuity of an audio signal finally obtained by decoding.

After being processed by the uplink media proxy 702, the bitstream of the new version protocol can be guaranteed to exist in the form of a standard bitstream and be transmitted to the next node, realizing forward compatibility.

In an embodiment of this application, the downlink media proxy 704 shown in FIG. 7 and FIG. 8 inputs the bitstream of the old version protocol (the bitstream of the old version protocol in the embodiment is a standard bitstream), and then an appropriate transcoding strategy may be selected according to attributes of the playback client 705 to which the bitstream needs to be delivered. For example, if the playback client 705 to which the bitstream needs to be delivered uses the standard bitstream, the downlink media proxy 704 can directly forward the standard bitstream to the playback client 705. If the playback client 705 to which the bitstream needs to be delivered uses the bitstream of the new version protocol (the bitstream of the new version protocol in the embodiment is the bitstream generated with the encoding method shown in FIG. 9 and having the structure shown in FIG. 10), the downlink media proxy 704 needs to transcode the inputted standard bitstream.

Figure 12:
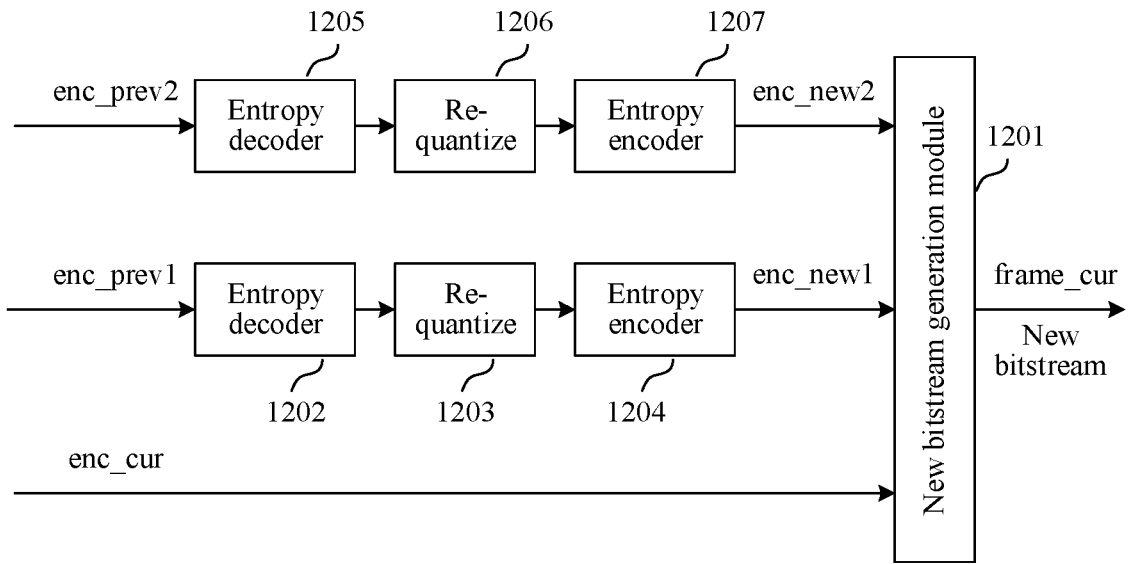
FIG. 12 is a schematic diagram of a processing process of a downlink media proxy shown in FIG. 7 and FIG. 8.
Figure 13:
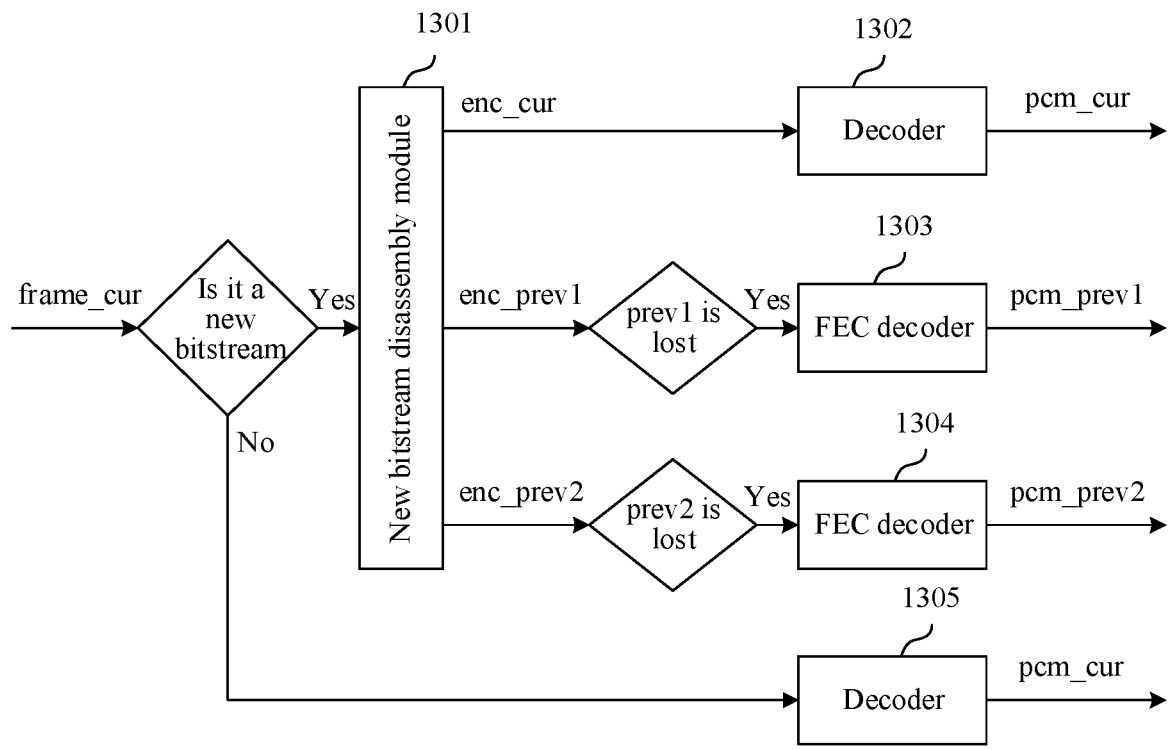
FIG. 13 is a schematic diagram of a processing process of a playback client shown in FIG. 7 and FIG. 8.

In an embodiment of this application, a process of transcoding, by the downlink media proxy 704, the inputted standard bitstream is shown in FIG. 12. It is assumed that an $n^{th}$-frame standard bitstream currently received by the downlink media proxy 704 and not including FEC encoding information is enc_cur, an $n-1^{th}$-frame standard bitstream is enc_prev1, and an $n-2^{th}$-frame standard bitstream is enc_prev2. Then, enc_cur is directly inputted to a new bitstream generation module 1201. enc_prev1 is entropy decoded by an entropy decoder 1202 to obtain several encoding parameters, and the encoding parameters are inputted to a re-quantization module 1203 for re-quantization and then inputted to an entropy encoder 1204 to obtain a processed bitstream enc_new1. enc_prev2 is entropy decoded by an entropy decoder 1205 to obtain several encoding parameters, and the encoding parameters are inputted to a re-quantization module 1206 for re-quantization and then inputted to an entropy encoder 1207 to obtain a processed bitstream enc_new2. Finally, an encoded frame frame_cur of a new bitstream is generated in the new bitstream generation module 1201 according to enc-new2, enc-new1, and enc_cur.

In an embodiment of this application, in FIG. 12, enc_prev1 and enc_prev2 are processed to obtain enc-new1 and enc-new2 which are inputted to the new bitstream generation module 1201 based on a main reason as follows. It is assumed that bit rates corresponding to enc_cur, enc_prev1, and enc_prev2 received by the downlink media proxy 704 are 16 kbps. If consecutive bitstreams of three frames are directly combined and transmitted to the playback client, the bit rates are 16-16-16. As a result, a downlink bandwidth may be increased. Therefore, enc_prev1 and enc_prev2 may be double-quantized (i.e., re-quantized) and encoded to reduce occupancy of the downlink bandwidth. One solution proposed in the embodiment of this application is as follows.

enc_prev1 and enc_prev2 are decoded by entropy decoders (i.e., the entropy decoders 1202 and 1205) to obtain a relevant parameter set. The parameter set may include: parameters such as subframe gain, line spectral frequency (LSF), pitch, long term prediction (LTP), and excitation signal energy. From the perspective of quantization distortion, bit consumption can be reduced by increasing the subframe gain and decreasing the excitation signal energy. Therefore, re-quantization logic (i.e., processing logic of the re-quantization modules 1203 and 1206) in the embodiment of this application may involve increasing current subframe gain (suppose an increment is delta) and simultaneously equally decreasing the excitation signal energy (a decrement is delta). In this process, the decreased excitation signal energy is re-quantized and a number of bits per unit time is counted. This process is suspended if the number of bits per unit time is less than a target bit rate. Otherwise, the subframe gain is further increased, and the excitation signal energy is equally decreased. The above operation is repeated until the number of bits per unit time is less than the target bit rate.

After the subframe gain and the excitation signal energy are re-quantized, re-quantized subframe gain and excitation signal energy are encoded by entropy encoders (i.e., the entropy encoders 1204 and 1207). Meanwhile, bitstreams of original LSF, Pitch, and LTP are combined to generate enc-new1 and enc-new2. The re-quantization operation proposed in the embodiment of this application can effectively reduce a downlink bandwidth occupied by a new bitstream generated according to enc-new1 and enc-new2.

In FIG. 12, the use of the entropy decoders (i.e., the entropy decoders 1202 and 1205) and the entropy encoders (i.e., the entropy encoders 1204 and 1207) can effectively increase decoding and encoding rates, and lower a requirement on performance of the downlink media proxy 704. Certainly, in other embodiments of this application, the entropy decoders and the entropy encoders in FIG. 12 may also be replaced with common standard decoders and encoders (such as Opus) for decoding and encoding.

In the embodiment shown in FIG. 12, enc-new2 and enc-new1 may be used as the FEC encoding results of the first two signal frames of the current signal frame respectively. Then, an encoded frame in the new bitstream finally outputted by the downlink media proxy 704 includes the FEC encoding results of the first two signal frames of the current signal frame (i.e., enc-new2 and enc-new1 in FIG. 12). In this case, the encoded frame in the new bitstream can be identified by the structure of the encoded frame shown in FIG. 10. The structure of the encoded frame may be obtained with reference to the technical solution in the foregoing embodiment. Details are not described.

In an embodiment of this application, the playback client 705 shown in FIG. 7 and FIG. 8 has a main function of decoding and playing back a bitstream after receiving the bitstream. If the playback client 705 receives a standard bitstream, the playback client 705 can decode the standard bitstream in a normal decoding manner. If the playback client 705 receives a bitstream of a new version protocol, a processing process of the playback client 705 may be shown in FIG. 13. Assuming that the current encoded frame received by the playback client 705 is frame_cur, it may be detected whether frame_cur is a bitstream of a new version protocol. If it is detected that frame_cur is a standard bitstream not including FEC encoding information, frame_cur is directly decoded by a decoder 1305 to obtain a current signal frame pcm_cur. If it is detected that frame_cur is a bitstream of a new version protocol, frame_cur is inputted to a new bitstream disassembly module 1301 to obtain standard bitstreams of 3 frames of information, i.e., enc_cur, enc_prev1, and enc_prev2.

The new bitstream disassembly module 1301 may perform disassembly based on a structure (i.e., the structure shown in FIG. 10) of the new bitstream. enc_cur is an encoding result of the current signal frame pcm_cur, enc_prev1 is an FEC encoding result of a previous frame pcm_prev1 of the current signal frame, and enc_prev2 is an FEC encoding result of the second frame pcm_prev2 of the current signal frame. After enc_cur, enc_prev1, and enc_prev2 are obtained, enc_cur is inputted to a decoder 1302 to obtain the current signal frame pcm_cur. enc_prev1 and enc_prev2 are processed in the following situations.

If a previous encoded frame (i.e., prev1) of the current encoded frame frame_cur is lost, enc_prev1 is inputted to an FEC decoder 1303, and an output result of the decoder 1303 is taken as the previous signal frame pcm_prev1 of the current encoded frame frame_cur. Certainly, if the previous encoded frame (i.e., prev1) of the current encoded frame frame_cur is normally received, enc_prev1 can be discarded.

If the second encoded frame (i.e., prev2) before the current encoded frame frame_cur is lost, enc_prev2 is inputted to an FEC decoder 1304, and an output result of the decoder 1304 is taken as the second signal frame pcm_prev2 before the current signal frame pcm_cur. Certainly, if the second encoded frame (i.e., prev2) before the current encoded frame frame_cur is normally received, enc_prev2 can be discarded.

The decoder 1302 may be a common decoder, such as an Opus decoder. Processing flows of the FEC decoder 1303 and the FEC decoder 1304 during the decoding may be the same as a processing flow of the decoder 1302.

In an embodiment of this application, if an encoded frame j is lost, a plurality of encoded frames after the encoded frame j are normally received, and the plurality of encoded frames include FEC encoding information corresponding to the encoded frame j, a signal frame corresponding to the encoded frame j can be generated according to an encoded frame closest to the encoded frame j. For example, if the encoded frame j is lost, an encoded frame j+1 and an encoded frame j+2 are normally received, and the encoded frame j+1 and the encoded frame j+2 include the FEC encoding information corresponding to the encoded frame j, the signal frame corresponding to the encoded frame j can be obtained by decoding according to the FEC encoding information in the encoded frame j+1. The manner of performing recovery through the closest encoded frame can ensure continuity of an audio signal obtained by decoding.

The technical solution in the embodiment of this application is described by taking encoding and decoding processes of the audio signal during transmission as an example. However, the technical solution in the embodiment of this application may also be extended to other multimedia data processing. For example, encoding and decoding of a video signal during transmission can be realized through the technical solution in the embodiment of this application, so that a quantity of forward signal frames corresponding to FEC encoding results included in an encoded frame can be dynamically indicated through a new encoded frame structure and the encoded frame can be flexibly adjusted based on a network state, thereby ensuring reliability of data transmission in a poor network state.

The following describes apparatus embodiments of this application, and the apparatus embodiments may be used for performing the method in the foregoing embodiment of this application. For details not disclosed in the apparatus embodiments of this application, refer to the foregoing method embodiments of this application.

Figure 14:
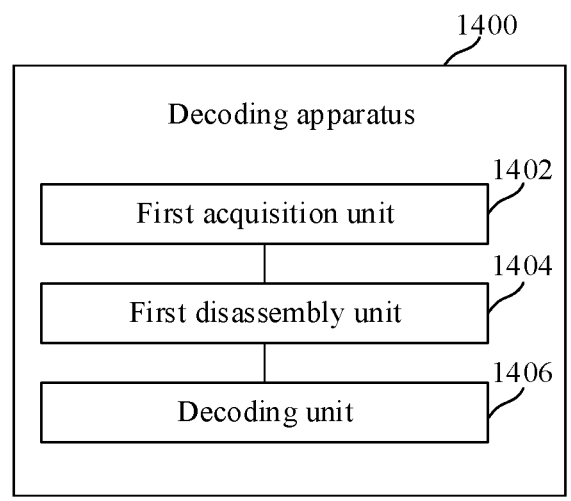
FIG. 14 is a block diagram of a decoding apparatus according to an embodiment of this application.

FIG. 14 is a block diagram of a decoding apparatus according to an embodiment of this application. The decoding apparatus may be disposed in a device with a computational processing function, for example, in a terminal device or a server.

Referring to FIG. 14, a decoding apparatus 1400 according to an embodiment of this application includes: a first acquisition unit 1402, a first disassembly unit 1404, and a decoding unit 1406.

The first acquisition unit 1402 is configured to acquire a to-be-decoded $i^{th}$ encoded frame. The first disassembly unit 1404 is configured to disassemble the $i^{th}$ encoded frame in response to the $i^{th}$ encoded frame including a flag bit for indicating a quantity n of FEC encoded frames, the flag bit being used for indicating that the $i^{th}$ encoded frame includes an encoding result corresponding to an $i^{th}$ signal frame and FEC encoding results respectively corresponding to first n signal frames of the $i^{th}$ signal frame. The decoding unit 1406 is configured to acquire the encoding result of the $i^{th}$ signal frame obtained by disassembling the $i^{th}$ encoded frame and the FEC encoding results respectively corresponding to the first n signal frames of the $i^{th}$ signal frame, the FEC encoding results respectively corresponding to the first n signal frames being respectively used for error correction on the first n signal frames, and decode the encoding result of the $i^{th}$ signal frame to obtain the $i^{th}$ signal frame.

In some embodiments of this application, based on the foregoing solution, the decoding unit 1406 is further configured to decode, in response to a $i^{th}$ encoded frame corresponding to a $j^{th}$ signal frame in the first n signal frames being not acquired and the $i^{th}$ encoded frame being a frame acquired from encoded frames after the $j^{th}$ encoded frame and closest to the $j^{th}$ encoded frame, the FEC encoding result corresponding to the $j^{th}$ signal frame obtained by disassembling the $i^{th}$ encoded frame, and generate the $j^{th}$ signal frame according to a decoding result.

In some embodiments of this application, based on the foregoing solution, the decoding unit 1406 is further configured to determine, in response to a $j^{th}$ encoded frame corresponding to a $j^{th}$ signal frame in the first n signal frames being not acquired and the $i^{th}$ encoded frame being not a frame acquired from encoded frames after the $j^{th}$ encoded frame and closest to the $j^{th}$ encoded frame, an acquired target encoded frame closest to the $j^{th}$ encoded frame, decode an FEC encoding result corresponding to the $j^{th}$ signal frame obtained by disassembling the target encoded frame, and generate the $j^{th}$ signal frame according to a decoding result.

In some embodiments of this application, based on the foregoing solution, the $i^{th}$ encoded frame further includes indicating bits and first fields corresponding to signal frames in the first n signal frames. The indicating bits corresponding to the signal frames are used for indicating lengths of FEC encoding results corresponding to the signal frames. The first fields corresponding to the signal frames are used for recording the FEC encoding results corresponding to the signal frames. The first disassembly unit 1404 is configured to acquire the FEC encoding results corresponding to the signal frames according to the indicating bits and the first fields corresponding to the signal frames included in the $i^{th}$ encoded frame.

In some embodiments of this application, based on the foregoing solution, the $i^{th}$ encoded frame further includes a second field corresponding to the $i^{th}$ signal frame. The second field is used for recording the encoding result corresponding to the $i^{th}$ signal frame. The first disassembly unit 1404 is configured to acquire the encoding result corresponding to the $i^{th}$ signal frame according to the second field included in the $i^{th}$ encoded frame.

In some embodiments of this application, based on the foregoing solution, n is determined according to a network state, and n is inversely correlated with the network state.

Figure 15:
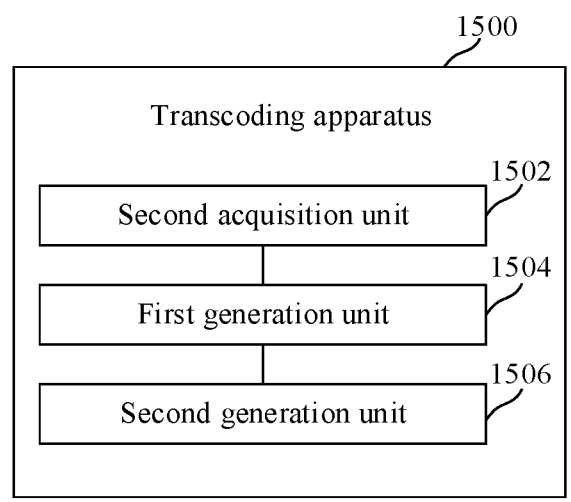
FIG. 15 is a block diagram of a transcoding apparatus according to an embodiment of this application.

FIG. 15 is a block diagram of a transcoding apparatus according to an embodiment of this application. The transcoding apparatus may be disposed in a device with a computational processing function, for example, in a terminal device or a server.

Referring to FIG. 15, a transcoding apparatus 1500 according to an embodiment of this application includes: a second acquisition unit 1502, a first generation unit 1504, and a second generation unit 1506.

The second acquisition unit 1502 is configured to acquire an encoding result of an $i^{th}$ signal frame. The first generation unit 1504 is configured to generate FEC encoding results respectively corresponding to first n signal frames of the $i^{th}$ signal frame. The second generation unit 1506 is configured to synthesize the encoding result corresponding to the $i^{th}$ signal frame and the FEC encoding results respectively corresponding to the first n signal frames to generate an encoded frame corresponding to the $i^{th}$ signal frame, the encoded frame including a flag bit for indicating a value of n.

The first generation unit 1504 is configured to generate encoding results respectively corresponding to the first n signal frames of the $i^{th}$ signal frame; and generate the FEC encoding results respectively corresponding to the first n signal frames according to the encoding results respectively corresponding to the first n signal frames.

In some embodiments of this application, based on the foregoing solution, the first generation unit 1504 is configured to: decode the encoding results respectively corresponding to the first n signal frames to obtain decoding results respectively corresponding to the first n signal frames; re-quantize the decoding results respectively corresponding to the first n signal frames to obtain quantization results respectively corresponding to the first n signal frames; and encode the quantization results respectively corresponding to the first n signal frames to generate the FEC encoding results respectively corresponding to the first n signal frames.

In some embodiments of this application, based on the foregoing solution, the first generation unit 1504 is configured to: entropy decode the encoding results respectively corresponding to the first n signal frames, and entropy encode the quantization results respectively corresponding to the first n signal frames.

In some embodiments of this application, based on the foregoing solution, the decoding results obtained by decoding the encoding results respectively corresponding to the first n signal frames include subframe gain and excitation signal energy; and the first generation unit 1504 is configured to: increase a value of the subframe gain and equally decrease the excitation signal energy; perform quantization based on the excitation signal energy to obtain a number of data bits; count the number of data bits, and stop increasing the value of the subframe gain and stop reducing the excitation signal energy in response to the number of data bits per unit time being less than a target bit rate; and take the value of the subframe gain stopped increasing and the excitation signal energy stopped reducing as the quantization results.

In some embodiments of this application, based on the foregoing solution, the second generation unit 1506 is further configured to: generate a specified encoded frame corresponding to the $i^{th}$ signal frame according to the encoding result of the $i^{th}$ signal frame and the FEC encoding result corresponding to the first 1 signal frame of the $i^{th}$ signal frame, the specified encoded frame not including the flag bit.

Figure 16:
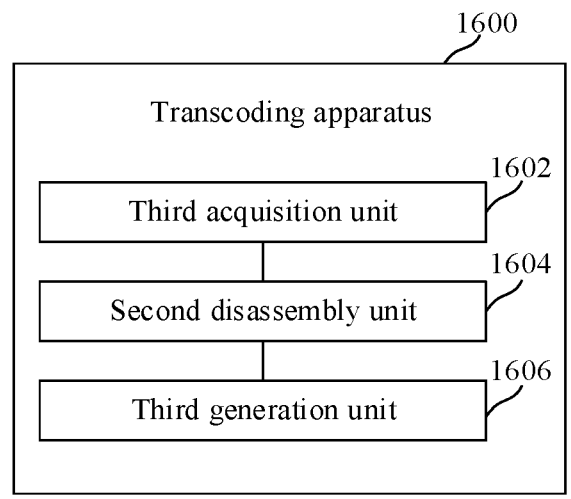
FIG. 16 is a block diagram of a transcoding apparatus according to an embodiment of this application.

FIG. 16 is a block diagram of a transcoding apparatus according to an embodiment of this application. The transcoding apparatus may be disposed in a device with a computational processing function, for example, in a terminal device or a server.

Referring to FIG. 16, a transcoding apparatus 1600 according to an embodiment of this application includes: a third acquisition unit 1602, a second disassembly unit 1604, and a third generation unit 1606.

The third acquisition unit 1602 is configured to acquire an $i^{th}$ encoded frame. The second disassembly unit 1604 is configured to disassemble the $i^{th}$ encoded frame in response to the $i^{th}$ encoded frame including a flag bit for indicating a quantity n of FEC encoded frames, the flag bit being used for indicating that the $i^{th}$ encoded frame includes an encoding result corresponding to an $i^{th}$ signal frame and FEC encoding results respectively corresponding to first n signal frames of the $i^{th}$ signal frame. The third generation unit 1606 is configured to acquire the encoding result of the $i^{th}$ signal frame obtained by disassembling the $i^{th}$ encoded frame and the FEC encoding results respectively corresponding to the first n signal frames of the $i^{th}$ signal frame, the FEC encoding results respectively corresponding to the first n signal frames being respectively used for error correction on the first n signal frames, and generate a bitstream after transcoding of the $i^{th}$ encoded frame based on the encoding result of the $i^{th}$ signal frame and the FEC encoding results respectively corresponding to the first n signal frames of the $i^{th}$ signal frame.

In some embodiments of this application, based on the foregoing solution, in response to generating a bitstream after transcoding based on the encoding result of the $i^{th}$ signal frame and the FEC encoding results respectively corresponding to the first n signal frames of the $i^{th}$ signal frame, the third generation unit 1606 is configured to generate a bitstream after transcoding corresponding to the $i^{th}$ signal frame based on the encoding result of the $i^{th}$ signal frame.

In some embodiments of this application, based on the foregoing solution, the third generation unit 1606 is configured to generate, in response to a $j^{th}$ encoded frame corresponding to a $j^{th}$ signal frame in the first n signal frames being not acquired and the $i^{th}$ encoded frame being a frame acquired from encoded frames after the $j^{th}$ encoded frame and closest to the $j^{th}$ encoded frame, a bitstream after transcoding corresponding to the $j^{th}$ signal frame according to an FEC encoding result corresponding to the $j^{th}$ signal frame obtained by disassembling the $i^{th}$ encoded frame.

In some embodiments of this application, based on the foregoing solution, the third generation unit 1606 is further configured to determine, in response to the $i^{th}$ encoded frame being not a frame acquired from encoded frames after the $j^{th}$ encoded frame and closest to the $j^{th}$ encoded frame, an acquired target encoded frame closest to the $j^{th}$ encoded frame, a bitstream after transcoding according to an FEC encoding result corresponding to the $j^{th}$ signal frame obtained by disassembling the target encoded frame.

In some embodiments of this application, based on the foregoing solution, the second disassembly unit 1604 is further configured to skip transcoding the $i^{th}$ encoded frame in response to the $i^{th}$ encoded frame not including the flag bit for indicating the quantity n of FEC encoded frames.

Figure 17:
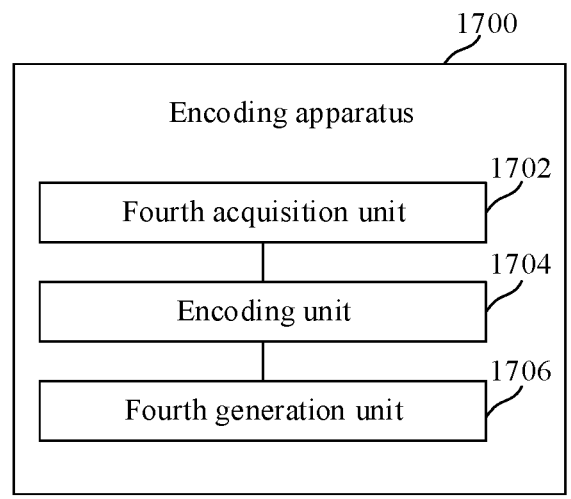
FIG. 17 is a block diagram of an encoding apparatus according to an embodiment of this application.

FIG. 17 is a block diagram of an encoding apparatus according to an embodiment of this application. The encoding apparatus may be disposed in a device with a computational processing function, for example, in a terminal device or a server.

Referring to FIG. 17, an encoding apparatus 1700 according to an embodiment of this application includes: a fourth acquisition unit 1702, an encoding unit 1704, and a fourth generation unit 1706.

The fourth acquisition unit 1702 is configured to acquire a to-be-encoded signal frame. The encoding unit 1704 is configured to encode the $i^{th}$ signal frame to obtain an encoding result corresponding to the $i^{th}$ signal frame, and perform FEC encoding on first n signal frames of the $i^{th}$ signal frame to obtain FEC encoding results respectively corresponding to the first n signal frames. The fourth generation unit 1706 is configured to synthesize the encoding result corresponding to the $i^{th}$ signal frame and the FEC encoding results respectively corresponding to the first n signal frames to generate an encoded frame corresponding to the $i^{th}$ signal frame, the encoded frame including a flag bit for indicating a value of n.

In some embodiments of this application, based on the foregoing solution, the encoding unit 1704 is further configured to determine a quantity n of FEC encoded frames of the $i^{th}$ signal frame according to a network state.

In some embodiments of this application, based on the foregoing solution, n is inversely correlated with the network state.

In some embodiments of this application, based on the foregoing solution, a bit rate of the encoding result corresponding to the $i^{th}$ signal frame is higher than bit rates of the FEC encoding results respectively corresponding to the first n signal frames.

In some embodiments of this application, based on the foregoing solution, the bit rate of the encoding result corresponding to the $i^{th}$ signal frame and the bit rates of the FEC encoding results respectively corresponding to the first n signal frames successively decrease from back to front.

In some embodiments of this application, based on the foregoing solution, the fourth acquisition unit 1702 is further configured to acquire receiving state information fed back by a receiving end of the encoded frame, the receiving state information including packet loss feedback information. The encoding unit 1704 is further configured to adjust the bit rates of the FEC encoding results respectively corresponding to the first n signal frames according to the packet loss feedback information.

Figure 18:
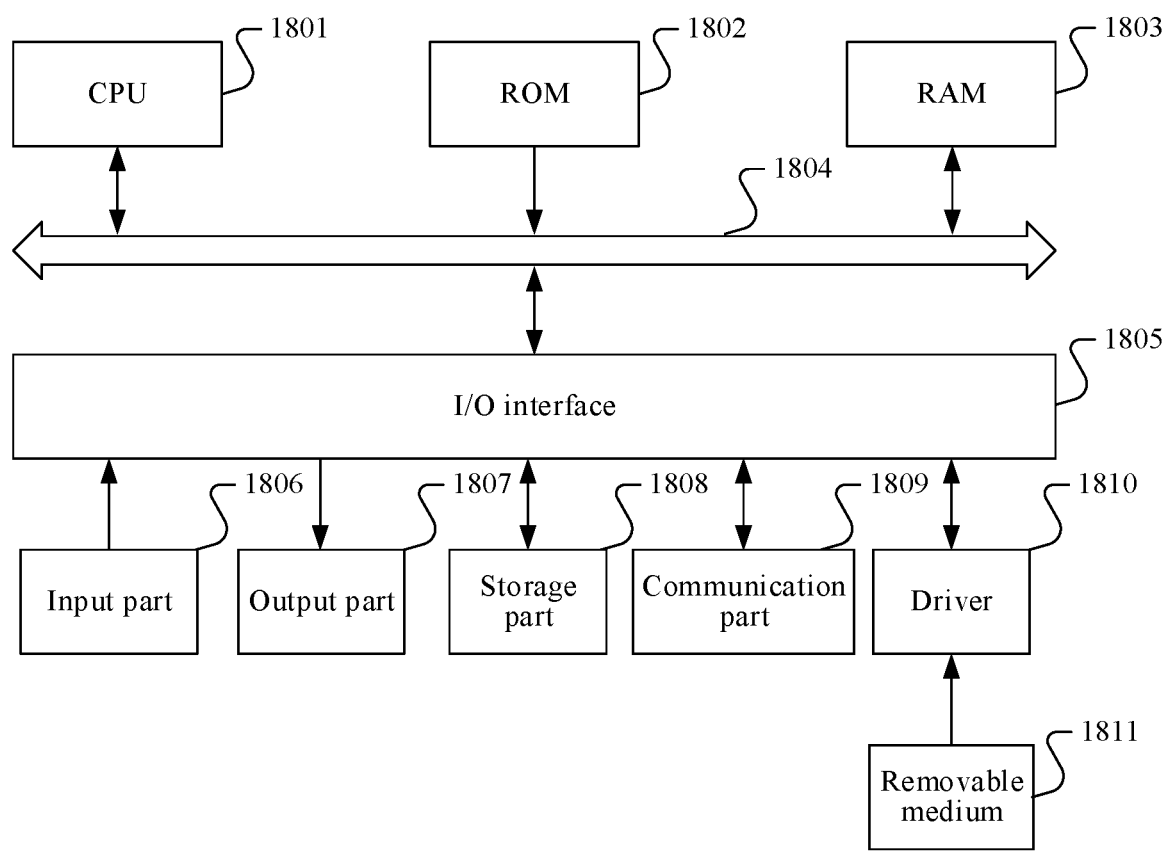
FIG. 18 is a schematic structural diagram of a computer system adapted to implement an electronic device according to an embodiment of this application.

FIG. 18 is a schematic structural diagram of a computer system adapted to implement an electronic device according to an embodiment of this application.

A computer system 1800 of the electronic device shown in FIG. 18 is merely an example, and does not constitute any limitation on functions and use ranges of the embodiments of this application.

As shown in FIG. 18, the computer system 1800 includes a central processing unit (CPU) 1801, which may perform various suitable actions and processing based on a program stored in a read-only memory (ROM) 1802 or a program loaded from a storage part 1808 into a random access memory (RAM) 1803, for example, perform the method described in the foregoing embodiments. The RAM 1803 further stores various programs and data required for system operations. The CPU 1801, the ROM 1802, and the RAM 1803 are connected to each other through a bus 1804. An input/output (I/O) interface 1805 is also connected to the bus 1804.

The following components are connected to the I/O interface 1805: an input part 1806 including a keyboard, a mouse, or the like; an output part 1807 including a cathode ray tube (CRT), a liquid crystal display (LCD), a speaker, or the like; a storage part 1808 including hard disk, or the like; and a communication part 1809 including a network interface card such as a local area network (LAN) card, a modem, or the like. The communication part 1809 performs communication processing by using a network such as the Internet. A driver 1810 is also connected to the I/O interface 1805 as required. A removable medium 1811, such as a magnetic disk, an optical disc, a magneto-optical disk, or a semiconductor memory, is installed on the driver 1810 as required, so that a computer program read from the removable medium is installed into the storage part 1808 as required.

Particularly, according to an embodiment of this application, the processes described in the following by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, by using the communication part 1809, the computer program may be downloaded and installed from a network, and/or installed from the removable medium 1811. When the computer program is executed by the CPU 1801, the various functions defined in the system of this application are executed.

Related units described in the embodiments of this application may be implemented in a software manner, or may be implemented in a hardware manner, and the unit described can also be set in a processor. Names of the units do not constitute a limitation on the units in a specific case.

In another aspect, this application further provides a computer-readable medium. The computer-readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a universal serial bus (USB) flash drive, a removable hard disk, or the like) or on a network, including several instructions for instructing a computing device (which may be a PC, a server, a touch terminal, a network device, or the like) to perform the methods according to the embodiments of this application.

After considering the specification and practicing the disclosed embodiments, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application.

It is to be understood that this application is not limited to the precise structures described above and shown in the accompanying drawings, and various modifications and changes may be made without departing from the scope of this application. The scope of this application is subject only to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A signal transcoding method performed by a computer device, the method comprising:
   acquiring an $i^{th}$ encoded frame;
   disassembling the $i^{th}$ encoded frame in response to the $i^{th}$ encoded frame comprising a flag bit for indicating a quantity n of forward error correction (FEC) encoded frames, the flag bit being used for indicating that the $i^{th}$ encoded frame comprises an encoding result corresponding to an $i^{th}$ signal frame and FEC encoding results respectively corresponding to first n signal frames of the $i^{th}$ signal frame;
   acquiring the encoding result of the $i^{th}$ signal frame obtained by disassembling the $i^{th}$ encoded frame and the FEC encoding results respectively corresponding to the first n signal frames of the $i^{th}$ signal frame, the FEC encoding results respectively corresponding to the first n signal frames being respectively used for error correction on the first n signal frames; and
   generating a bitstream after transcoding based on the encoding result of the $i^{th}$ signal frame and the FEC encoding results respectively corresponding to the first n signal frames of the $i^{th}$ signal frame.

2. The signal transcoding method of claim 1, wherein the generating a bitstream after transcoding based on the encoding result of the $i^{th}$ signal frame and the FEC encoding results respectively corresponding to the first n signal frames of the $i^{th}$ signal frame comprises:
   generating a bitstream after transcoding corresponding to the $i^{th}$ signal frame based on the encoding result of the $i^{th}$ signal frame.

3. The signal transcoding method of claim 1, wherein the generating a bitstream after transcoding based on the encoding result of the $i^{th}$ signal frame and the FEC encoding results respectively corresponding to the first n signal frames of the $i^{th}$ signal frame comprises:
   generating, in response to a $j^{th}$ encoded frame corresponding to a $j^{th}$ signal frame in the first n signal frames being not acquired and the $i^{th}$ encoded frame being a frame acquired from encoded frames after the $j^{th}$ encoded frame and closest to the $j^{th}$ encoded frame, a bitstream after transcoding corresponding to the $j^{th}$ signal frame according to an FEC encoding result corresponding to the $j^{th}$ signal frame obtained by disassembling the $i^{th}$ encoded frame.

4. The signal transcoding method of claim 1, wherein the method further comprises:
   skipping transcoding the $i^{th}$ encoded frame in response to the $i^{th}$ encoded frame not comprising the flag bit for indicating the quantity n of FEC encoded frames.

5. The signal transcoding method of claim 1, wherein the $i^{th}$ encoded frame is generated by:
   acquiring the encoding result of the $i^{th}$ signal frame;
   generating the FEC encoding results respectively corresponding to the first n signal frames of the $i^{th}$ signal frame; and
   synthesizing the encoding result corresponding to the $i^{th}$ signal frame and the FEC encoding results respectively corresponding to the first n signal frames to generate the $i^{th}$ encoded frame corresponding to the $i^{th}$ signal frame, the encoded frame comprising the flag bit for indicating the value of n.

6. The signal transcoding method of claim 5, wherein the generating the FEC encoding results respectively corresponding to the first n signal frames of the $i^{th}$ signal frame comprises:
   generating encoding results respectively corresponding to the first n signal frames of the $i^{th}$ signal frame; and
   generating the FEC encoding results respectively corresponding to first n signal frames according to the encoding results respectively corresponding to the first n signal frames.

7. The signal transcoding method of claim 5, wherein the method further comprises:
   generating a specified encoded frame corresponding to the $i^{th}$ signal frame according to the encoding result of the $i^{th}$ signal frame and the FEC encoding result corresponding to the first 1 signal frame of the $i^{th}$ signal frame, the specified encoded frame not comprising the flag bit.

8. The signal transcoding method of claim 6, wherein the generating the FEC encoding results respectively corresponding to first n signal frames according to the encoding results respectively corresponding to the first n signal frames comprises:
   decoding the encoding results respectively corresponding to the first n signal frames to obtain decoding results respectively corresponding to the first n signal frames;
   re-quantizing the decoding results respectively corresponding to the first n signal frames to obtain quantization results respectively corresponding to the first n signal frames; and
   encoding the quantization results respectively corresponding to the first n signal frames to generate the FEC encoding results respectively corresponding to the first n signal frames.

9. The signal transcoding method of claim 8, wherein
   the decoding the encoding results respectively corresponding to the first n signal frames comprises: entropy decoding the encoding results respectively corresponding to the first n signal frames; and
   the encoding the quantization results respectively corresponding to the first n signal frames comprises: entropy encoding the quantization results respectively corresponding to the first n signal frames.

10. The signal transcoding method of claim 8, wherein the decoding results obtained by decoding the encoding results respectively corresponding to the first n signal frames comprise subframe gain and excitation signal energy; and
   the re-quantizing the decoding results respectively corresponding to the first n signal frames comprises:
   increasing a value of the subframe gain and equally decreasing the excitation signal energy;
   performing quantization based on the excitation signal energy to obtain a number of data bits;
   counting the number of data bits, and stopping increasing the value of the subframe gain and stopping reducing the excitation signal energy in response to the number of data bits per unit time being less than a target bit rate; and taking the value of the subframe gain stopped increasing and the excitation signal energy stopped reducing as the quantization results.

11. The signal transcoding method of claim 5, wherein n is determined according to a network state, and n is inversely correlated with the network state.

12. A non-transitory computer-readable medium, storing a computer program which, when executed by a processor of an electronic device, causing the processor to implement a signal transcoding method, the method comprising:
acquiring an $i^{th}$ encoded frame;
disassembling the $i^{th}$ encoded frame in response to the $i^{th}$ encoded frame comprising a flag bit for indicating a quantity n of forward error correction (FEC) encoded frames, the flag bit being used for indicating that the $i^{th}$ encoded frame comprises an encoding result corresponding to an $i^{th}$ signal frame and FEC encoding results respectively corresponding to first n signal frames of the $i^{th}$ signal frame;
acquiring the encoding result of the $i^{th}$ signal frame obtained by disassembling the $i^{th}$ encoded frame and the FEC encoding results respectively corresponding to the first n signal frames of the $i^{th}$ signal frame, the FEC encoding results respectively corresponding to the first n signal frames being respectively used for error correction on the first n signal frames; and
generating a bitstream after transcoding based on the encoding result of the $i^{th}$ signal frame and the FEC encoding results respectively corresponding to the first n signal frames of the $i^{th}$ signal frame.

13. The non-transitory computer-readable medium of claim 12, wherein the generating a bitstream after transcoding based on the encoding result of the $i^{th}$ signal frame and the FEC encoding results respectively corresponding to the first n signal frames of the $i^{th}$ signal frame comprises:
generating a bitstream after transcoding corresponding to the $i^{th}$ signal frame based on the encoding result of the $i^{th}$ signal frame.

14. The non-transitory computer-readable medium of claim 12, wherein the generating a bitstream after transcoding based on the encoding result of the $i^{th}$ signal frame and the FEC encoding results respectively corresponding to the first n signal frames of the $i^{th}$ signal frame comprises:
generating, in response to a $j^{th}$ encoded frame corresponding to a $j^{th}$ signal frame in the first n signal frames being not acquired and the $i^{th}$ encoded frame being a frame acquired from encoded frames after the $j^{th}$ encoded frame and closest to the $j^{th}$ encoded frame, a bitstream after transcoding corresponding to the $j^{th}$ signal frame according to an FEC encoding result corresponding to the $j^{th}$ signal frame obtained by disassembling the $i^{th}$ encoded frame.

15. The non-transitory computer-readable medium of claim 12, wherein the method further comprises:
skipping transcoding the $i^{th}$ encoded frame in response to the $i^{th}$ encoded frame not comprising the flag bit for indicating the quantity n of FEC encoded frames.

16. An electronic device, comprising:
one or more processors; and
a storage apparatus configured to store one or more programs that, when executed by the one or more processors, cause the electronic device to implement a signal transcoding method, the method comprising:
acquiring an $i^{th}$ encoded frame;
disassembling the $i^{th}$ encoded frame in response to the $i^{th}$ encoded frame comprising a flag bit for indicating a quantity n of forward error correction (FEC) encoded frames, the flag bit being used for indicating that the $i^{th}$ encoded frame comprises an encoding result corresponding to an $i^{th}$ signal frame and FEC encoding results respectively corresponding to first n signal frames of the $i^{th}$ signal frame;
acquiring the encoding result of the $i^{th}$ signal frame obtained by disassembling the $i^{th}$ encoded frame and the FEC encoding results respectively corresponding to the first n signal frames of the $i^{th}$ signal frame, the FEC encoding results respectively corresponding to the first n signal frames being respectively used for error correction on the first n signal frames; and
generating a bitstream after transcoding based on the encoding result of the $i^{th}$ signal frame and the FEC encoding results respectively corresponding to the first n signal frames of the $i^{th}$ signal frame.

17. The electronic device of claim 16, wherein the generating a bitstream after transcoding based on the encoding result of the $i^{th}$ signal frame and the FEC encoding results respectively corresponding to the first n signal frames of the $i^{th}$ signal frame comprises:
generating a bitstream after transcoding corresponding to the $i^{th}$ signal frame based on the encoding result of the $i^{th}$ signal frame.

18. The electronic device of claim 16, wherein the generating a bitstream after transcoding based on the encoding result of the $i^{th}$ signal frame and the FEC encoding results respectively corresponding to the first n signal frames of the $i^{th}$ signal frame comprises:
generating, in response to a $j^{th}$ encoded frame corresponding to a $j^{th}$ signal frame in the first n signal frames being not acquired and the $i^{th}$ encoded frame being a frame acquired from encoded frames after the $j^{th}$ encoded frame and closest to the $j^{th}$ encoded frame, a bitstream after transcoding corresponding to the $j^{th}$ signal frame according to an FEC encoding result corresponding to the $j^{th}$ signal frame obtained by disassembling the $i^{th}$ encoded frame.

19. The electronic device of claim 16, wherein the method further comprises:
skipping transcoding the $i^{th}$ encoded frame in response to the $i^{th}$ encoded frame not comprising the flag bit for indicating the quantity n of FEC encoded frames.

20. The electronic device of claim 16, wherein the $i^{th}$ encoded frame is generated by:
acquiring the encoding result of the $i^{th}$ signal frame;
generating the FEC encoding results respectively corresponding to the first n signal frames of the $i^{th}$ signal frame; and
synthesizing the encoding result corresponding to the $i^{th}$ signal frame and the FEC encoding results respectively corresponding to the first n signal frames to generate the $i^{th}$ encoded frame corresponding to the $i^{th}$ signal frame, the encoded frame comprising the flag bit for indicating the value of n.

* * * * *